(12) United States Patent
Havens

(10) Patent No.: US 7,188,042 B2
(45) Date of Patent: Mar. 6, 2007

(54) METHOD AND APPARATUS FOR ACQUIRING AND PROCESSING TRANSDUCER DATA

(76) Inventor: Steven W. Havens, 302 S. Center St., Stockbridge, MI (US) 49285

( * ) Notice: Subject to any disclaimer, the term of this patent is extended or adjusted under 35 U.S.C. 154(b) by 262 days.

(21) Appl. No.: 10/674,828

(22) Filed: Oct. 1, 2003

(65) Prior Publication Data

US 2004/0215419 A1 Oct. 28, 2004

Related U.S. Application Data

(60) Provisional application No. 60/505,729, filed on Sep. 26, 2003, provisional application No. 60/415,772, filed on Oct. 4, 2002.

(51) Int. Cl.
*G01C 25/00* (2006.01)
*G06F 19/00* (2006.01)

(52) U.S. Cl. ....................................... 702/116

(58) Field of Classification Search .................. 702/91, 702/104, 178, 116, 187
See application file for complete search history.

(56) References Cited

U.S. PATENT DOCUMENTS

| | | | | |
|---|---|---|---|---|
| 4,604,904 A | * | 8/1986 | Massen | 73/861.06 |
| 6,455,319 B1 | * | 9/2002 | Lewis et al. | 436/151 |
| 2005/0046569 A1 | * | 3/2005 | Spriggs et al. | 340/551 |

* cited by examiner

*Primary Examiner*—Michael Nghiem
(74) *Attorney, Agent, or Firm*—Law Offices of John Chupa and Associates, P.C.

(57) ABSTRACT

A method and apparatus for correlating raw transducer data in a system of transducers communicates transducer data in a common format. Transducer data and relationships between transducers are characterized in a common format, and interdependencies of transducers are defined for modeling a system. The data is time correlated from the various transducers. Data is archived, updated and exchanged without being corrupted.

3 Claims, 15 Drawing Sheets

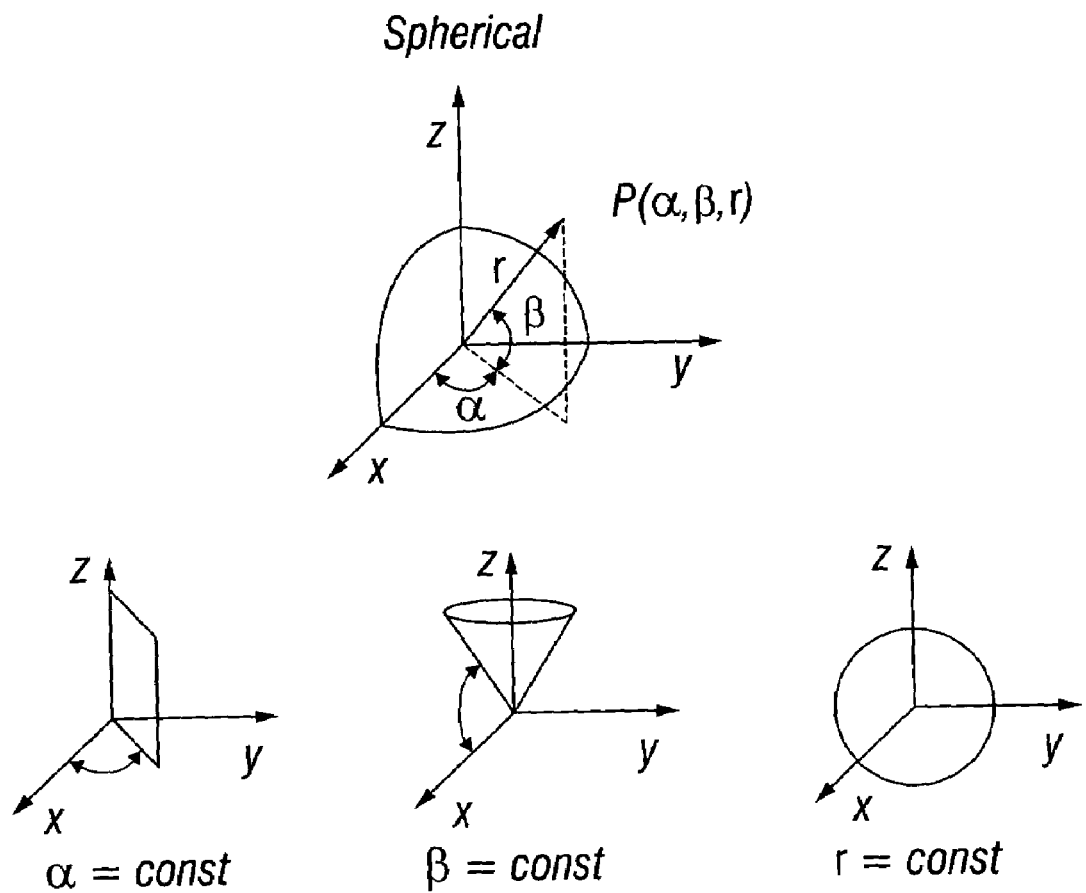
FIG. 15
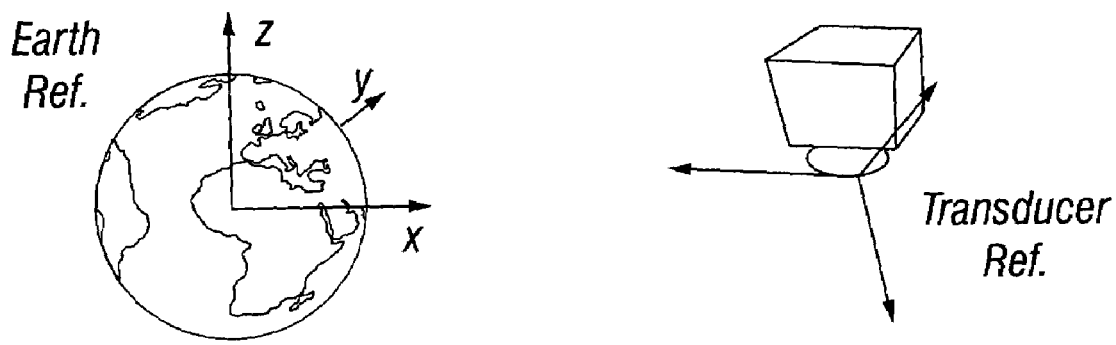
FIG. 16
FIG. 17

METHOD AND APPARATUS FOR ACQUIRING AND PROCESSING TRANSDUCER DATA

REFERENCE TO RELATED APPLICATIONS

This application is related to Provisional Application Ser. Nos. 60/415,772 filed Oct. 4, 2002, and 60/505,729 filed Sep. 26, 2003, the teachings of which are incorporated herein by reference.

GOVERNMENT RIGHTS

This invention was made pursuant to U.S. Government contract nos. F33615-03-C-1437 (USAF); F33615-02-M-1189 (USAF); and DASG 60-030P-0280 (U.S. Army Space and Missile Defense Command).

BACKGROUND OF THE INVENTION

The present invention pertains to a method for establishing a common basis for the exchange and processing of transducer (i.e. sensor and emitter) data acquired from a plurality of diverse transducers. In particular, the invention pertains to a method and apparatus for providing a common basis for capturing data in real time from diverse transducers. The data may be used immediately or may be archived without corruption.

Currently standards exist for the capture of data. However, current standards do not meet the accuracy and efficiency requirements for capturing in real-time multi-sensor data. Indeed, the failure to characterize data as sensor data misdirects the task and undermines the objectives of efficient and effective data capture.

In many data capture applications, it is desirable to obtain data from one or more transducers at various locations. These data may be produced by various devices and may be expressed in a variety of forms. In order to be useful in a meaningful way, these data must be processed and correlated. However, the data is difficult to correlate because data from one type of transducer may be incompatable with the data from other types of transducers, and it is necessary to reconfigure the expression of the data in order to facilitate their utilization. Such reconfiguration sometimes results in a corruption of the data from its original form, which in turn results in a loss of accuracy.

In addition, these data must be appropriately organized so that data from related devices may be accurately tracked in time and space. Such organization requires the generation of meta-data, i.e. data about data, having a complexity which increases as the complexity of the expressed form of the transducer data increases. This complex meta-data consumes valuable processor memory and diminishes processor efficiency.

The data produced by various transducers may be generated at different times and at different frequencies or intervals depending on the system requirements. For example, it may be necessary to record the position, or temperature of a sensor less frequently than it is necessary to record the image produced by such sensor. This is because the image may change more frequently than the temperature of the sensor, and the motion of the sensor may be uniform, and hence its position may be readily computed.

At the same time, it may be necessary, in a particular application, to correlate the primary image data with the secondary temporal, positional and temperature data. In conventional systems this secondary data may be inserted in a header as meta-data preceding the image data. This form of data acquisition results in high processor overhead, and is inefficient and inconvenient to handle.

Finally, it is difficult to transmit large amounts of data in an efficient manner, especially where the large amounts of complex meta-data are involved. Here too, complexities associated with the diverse expression of data increase communications system requirements, particularly bandwidth and processor speed.

SUMMARY OF THE INVENTION

The invention is based upon the discovery that transducer data may be expressed or modeled uniformly in terms of a Transducer Characteristic Frame (TCF). Each transducer will have a unique TCF. All models for a transducer will employ the same TCF structure.
  a. clusters
  b. TCF
  c. Samples
  d. Measurements Models or descriptions of data follow a preselected hierarchy of measurements, samples and clusters. Spatial, timing and sequencing characteristics of the data employs the TCF. Data is correlated from any arbitrary set of transducers using the model and data structure. Interpretation of data from the arbitrary set of transducers is achieved by interpolating samples occurring during successive acquisition time intervals or ticks. Data is communicated from any transducer using the preselected hierarchy.

BRIEF DESCRIPTION OF THE DRAWINGS

FIG. 15 is a depiction of a basic polar coordinate system.

FIG. 16 is a depiction of an earth centered coordinate system.

FIG. 17 is a depiction of a platform coordinate system.

DESCRIPTION OF THE INVENTION

The invention is directed to a method and apparatus for collecting, organizing, correlating and communicating transducer data from a plurality of diverse transducers. A transducer is any device which produces an output which may be monitored. Transducers may include known sensors or emmitters of various types which are discussed below. Transducers may also include devices yet to be developed, but which according to the invention, may be readily incorporated in accordance with the TCF of the newly developed sensor.

Figure 1:
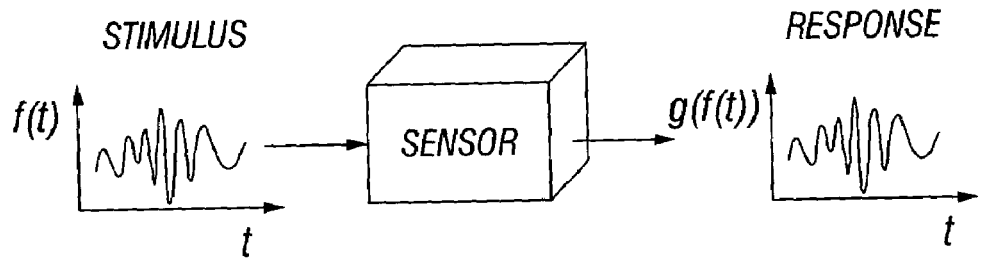
FIG. 1 is a schematic illustration of a sensor showing the stimulus and the response characteristics.

As used herein, a transducer may be defined as any device that produces a response as a function of a stimulus (i.e. a sensor); or a device that produces transmitted energy (i.e. an emitter). The term transducer is general and is used as such; the terms sensor and emitter are particular examples of specialized transducers and are used throughout this discussion as appropriate. FIG. 1 illustrates a sensor producing an output (response) in response to an input (stimulus).

Figure 2:
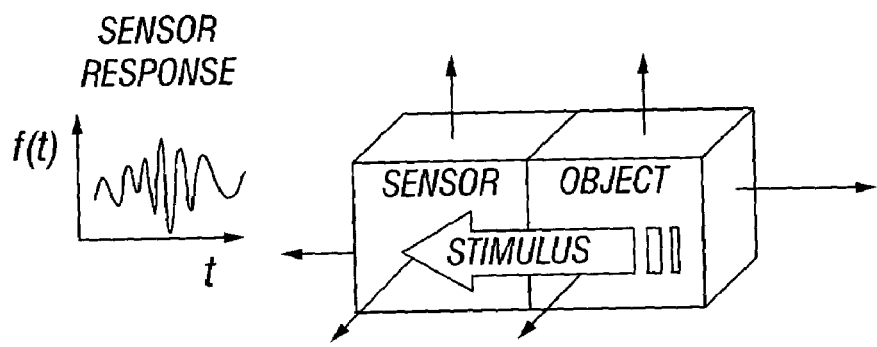
FIG. 2 is a schematic representation of an in-situ sensor and its corresponding response.

There are basically two general types of transducers, namely: in-situ transducers es and remote transducers. In-situ sensors are transducers that make measurements at the origin of the stimulus. They are typically in contact with an object of which a measurement is made. Some examples are pressure and temperature sensors, rotational encoders, geopositioning satellites (GPS) and internal measurement units (IMU). FIG. 2 illustrates an in-situ sensor in contact with an object and its response.

Figure 3:
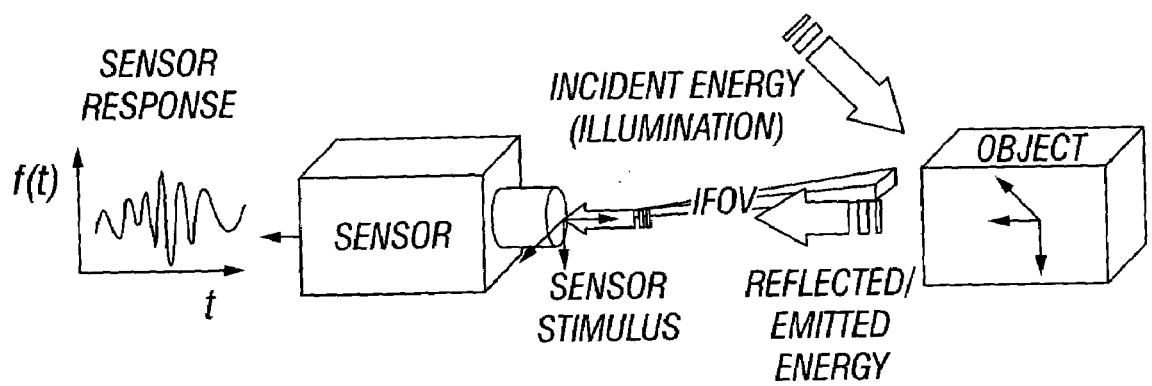
FIG. 3 is a schematic block diagram of a remote sensor showing the instantaneous field of view and the corresponding response.

A remote transducer, which can be active or passive sensor, measures characteristics of the environment represented by the state of a remote object. Remote sensors typically measure energy modulation. A remote sensor can be characterized as having an Instantaneous Field Of View (IFOV). FIG. 3 illustrates a passive remote sensor with an IFOV wherein the information detected by the sensor is reflected energy. Such sensors measure the emitance and reflectance of an object. Such sensors typically rely on the illumination from ambient sources for their reflected illumination.

Figure 4:
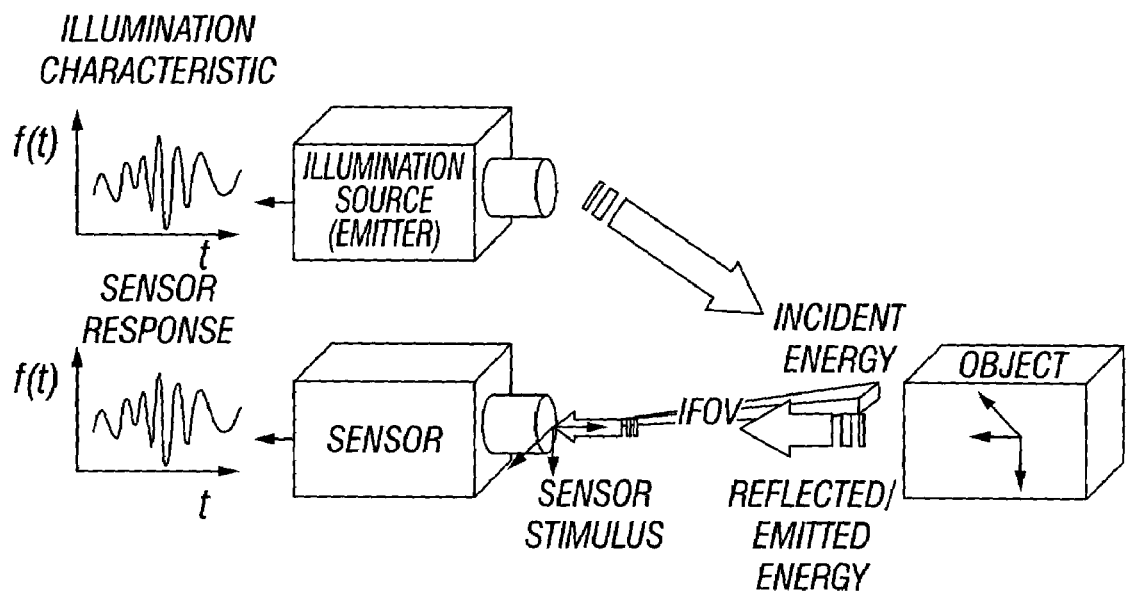
FIG. 4 is a schematic illustration of an active remote sensor showing IFOV and the characteristics of the source illumination and response.

Active remote transducers are sensors that provide the necessary illumination in order to measure the reflectance from the object. The characteristics of the illumination source must be known. FIG. 4 illustrates such an active sensor wherein an illumination source or emitter produces illumination and the sensor is responsive to the reflected energy from the object IFOV. In the example, the illumination source and sensor are each considered to be transducers.

Emitters can be generally characterized as transducers which are the reciprocal of a remote sensor. Instead of an input energy producing a response signal, an emitter uses an in put signal to produce an output energy.

Figure 5:
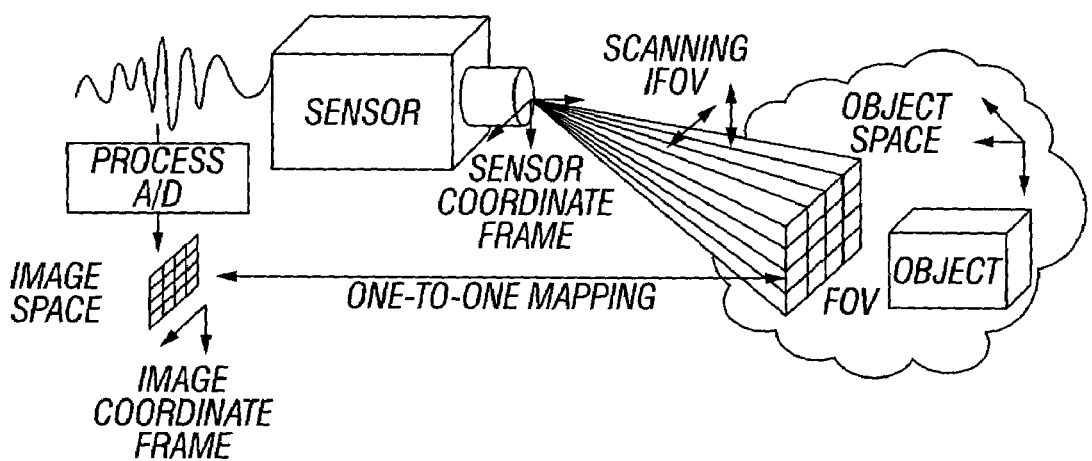
FIG. 5 is a schematic representation of a scanning IFOV remote sensor showing object and image space.

Remote sensors may be further employed to scan the IFOV in order to cover a wider field of view (FOV) by taking many samples, each sampling different space of their own IFOV. As shown in FIG. 5, remote sensors, which scan the IFOV in the entire FOV either by sequencing multiple detectors or by moving the IFOV of a single detector and taking multiple samples from that detector during the motion are referred to as scanning sensors. The scanning of a remote sensor is typically implied in the data structure of the sensor response. Some imaging sensors rely on IFOV scanning to produce an image of the object space. Some sensors known as framing sensors do not scan, but have multiple detection with individual IFOVs arranged in such a way so as to cover a large field of view. Samples making up a frame form a framing sensor are all from the same instant of time. The sample from a scanning sensor have sequential time sampling over an imaging interval. Although the data produced by such diverse systems have different characteristics, the invention provides a method and apparatus for combining the data from any number of diverse transducers.

The structure of all transducer data is described in the following hierarchy.

1. Transducers produce measurements. A measurement is a single data point.

2. A transducer sample comprises one or more measurements. Every measurement in a sample corresponds to particular temporal and spatial coordinates.

3. A Transducer Characteristic Frame (TCF) comprises a set of transducer samples. The TCF is the minimum set of samples that must be considered in order to characterize the transducer.

4. Transducer data is sent in clusters. A cluster is a specified whole TCF. A cluster may be a portion or set fraction of a TCF when the TCF is very large.

The invention provides a method and apparatus for: (a) describing (that is, modeling) the particular data structure of any transducer relative to the hierarchy of measurements, samples, TCF and clusters; (b) communicating the data from any transducer using this hierarchy; and (c) correlating the data from any arbitrary set of transducers using the model and data structure.

Transducers are normalized by providing a universal method of modeling transducer data based on a transducer characteristic frame (TCF).

Certain terms are used throughout the description and are thus introduced generally below.

The Transducer Characteristic Frame (TCF) is a set of samples comprising a series of measurements organized so as to compartmentalize the measurements in a way that resembles the physical layout of the transducer. If, for example, the transducer is a push broom scanner having 1×n pixels, the TCF will be organized in a 1×n array.

A model represents a feature of the transducer which may be expressed. For example, a pixel may have a selected orinetation with respect to the focus of a camera. This orientation has two spatial components, sometimes referred to as alpha (α) and beta (β) angles as described using a spherical coordinate system. According to the invention, the model for α is a series of numbers for the α component of each 1×n pixel; and the β model is a series of numbers for the β component of each 1×n pixel. Other features, described hereinafter, will be modeled in the same way so that all models of data look like the TCF of the transducer. The models appear as layers having the same appearance or corresponding properties and characteristics of a transducer.

The dimensionality characteristic of the TCF is the number of object space coordinates needed to specify the spatial characteristics of each transducer sample relative to a transducer reference system. In normal three dimensional space, the dimensionality can be zero, one, two or three. It should be understood that dimensionality is not so limited, but may be easily expanded if desired. Each dimension of the TCF can be assigned a spatial coordinate from one of the coordinate systems. In the exemplary embodiments described herein, the object space can be either Cartesian coordinates, i.e. x, y, z coordinates, or spherical coordinates, i.e α, β, r coordinates. However, it should be understood that any coodinate system (such as cylindrical) may be adopted and incorporated into the system of the invention.

In situ transducers which have no IFOM have a single sample and have a dimensionality of zero. Examples of zero dimensional (that is, non-dimensional) transducers include rotational encoders, thermocouples, voltmeters, global position system (GPS), microphones and inertial navigation sensors shown in FIG. 6. Non-dimensional transducers are usually in-situ sensors. A single sample may have one or more measurements. For example, a thermocouple may give a temperature measurement. A global positioning system (GPS), on the other hand, may produce latitude, longitude or altitude measurements in a single sample.

One dimensional TCFs use one coordinate from the set of object space coordinates to characterize the spatial characteristics of each sample within the TCF. A radar sensor or a depth sounder are examples of a one-dimensional TCF, because each sample in the TCF represents the response or stimulus at a certain range from the transducer. See FIG. 6.

Figure 6:
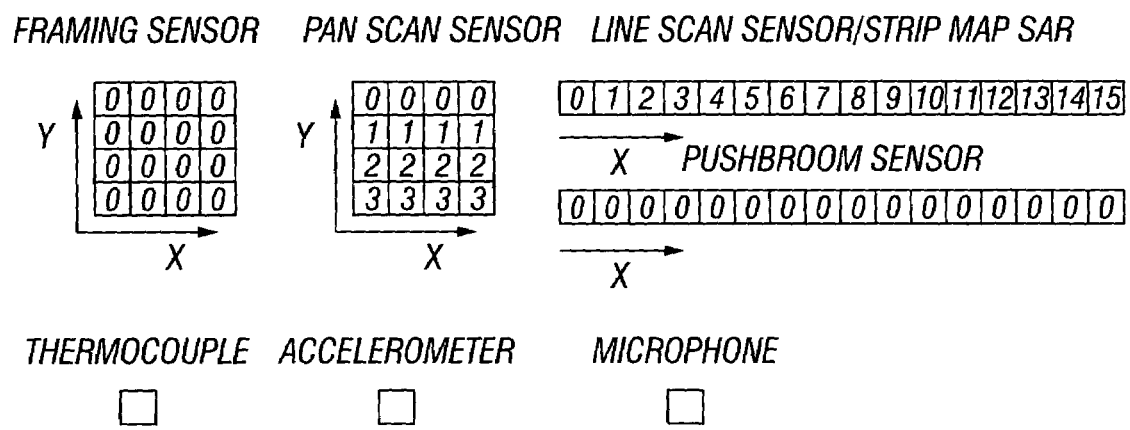
FIG. 6 is a generalized illustration of sensor frames showing dimensionality and relative timing samples for diverse sensors.

Two dimensional TCFs use two coordinates to characterize the spatial relationship of each sample. Most imagining sensors have a two-dimensional TCF. An n xm framing sensor or a pan scan sensor, depicted in FIG. 6, are examples of two dimensional sensors. The dimensions on the TCF can be any pair of coordinates taken from the coordinate systems (Cartesian, spherical, etc.).

In accordance with the invention, all TCF models of a particular transducer have the same TCF configuration. If the TCF is 11,000 samples in a 50 by 220 grid, then all models will have 11000 values in a 50 by 220 grid. If the TCF is a 4×4 grid, the models of the data will be 4×4 as well. There is a one to one correlation between the samples of the measurement TCF and the tcf_models. Some common models of transducers include a coordinate TCF model; a temporal TCF model; and a sequence TCF model. Certain transducers have additional models which may be employed to describe changes between samples particular to the transducer samples, for example, radiometric gain. In addition, models may be added as required to describe additional relationships as they become relevant. Any characteristic used to describe a sample which varies over the TCF may use a TCF model to describe that variance (e.g. measurement duration, gain).

A coordinate model defines the spatial ambiguity of transducer samples. There is a coordinate model for each coordinate of a TCF. For instance, a two-dimensional TCF of 50×220 samples would have two coordinate models each with 50×220 cells.

Figure 7:
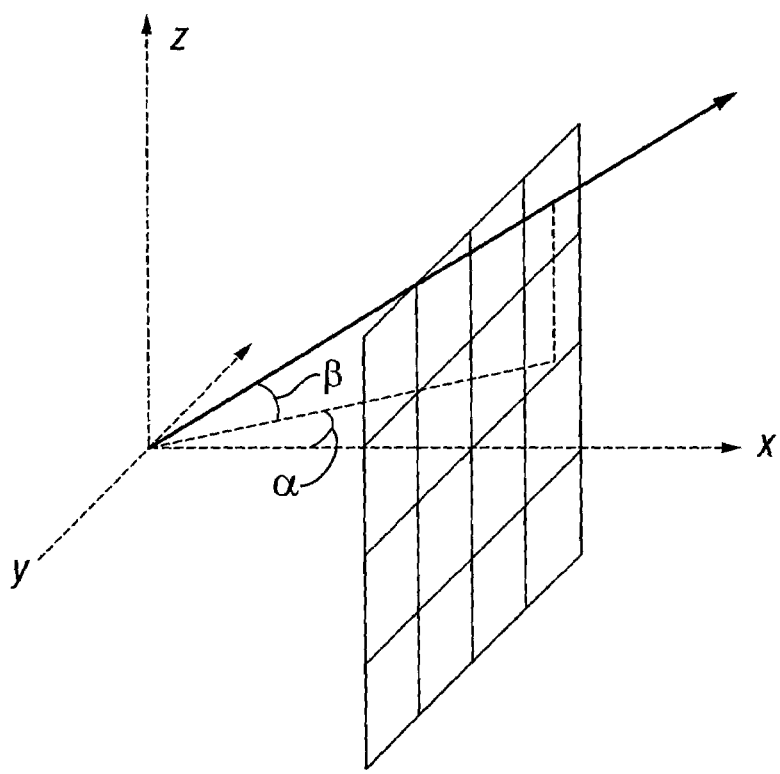
FIG. 7 is a schematic representation of a framing sensor showing the derivation of look angle vectors.

The coordinate model associates the transducer samples to the physical world. In a framing sensor camera, for example, having a 4×4 array of 16 pixels, as depicted in FIGS. 6 and 7, each sample has two dimension spatial components, namely α and β, associated in each sample dimension, x and y. There are 2-dimensions modeling 3-dimensional space, leaving one dimension ambiguous. The spatial ambiguity for a camera illustrated in FIG. 7, is based on the fact that rays pass through a vertex point located at the origin of the transducer reference system to strike the transducer lying in a focal plane. In FIG. 7, the sample in the upper right hand corner (sample: x=0, y=4) will be pointing at an angle α (0,3) with respect to the transducer reference system; and at an angle β (0,3) with respect to the transducer reference system. The sample (0,0) in the upper right hand corner will be pointing at a different angle α (0,0) and β (0,0). Likewise, each pixel has a corresponding alpha and beta measurement associated therewith. The alpha and beta measurmentscontained in a TCF structure called a tcf_model, so that the data is self consistent. Examples of the alpha and beta tcf models for the arrangement of FIG. 7 are illustrated in Table I.

TABLE I

| α (x, y) | | | |
|---|---|---|---|
| α (0, 0) | α (1, 0) | α (2, 0) | α (3, 0) |
| α (0, 1) | α (1, 1) | α (2, 1) | α (3, 1) |
| α (0, 2) | α (1, 2) | α (2, 2) | α (3, 2) |
| α (0, 3) | α (1, 3) | α (2, 2) | α (3, 3) |
| β (x, y) | | | |
| β (0, 0) | β (1, 0) | β (2, 0) | β (3, 0) |
| β (0, 1) | β (1, 1) | β (2, 1) | β (3, 1) |
| β (0, 2) | β (1, 2) | β (2, 2) | β (3, 2) |
| β (0, 3) | β (1, 3) | β (2, 3) | β (3, 3) |

Figure 8:
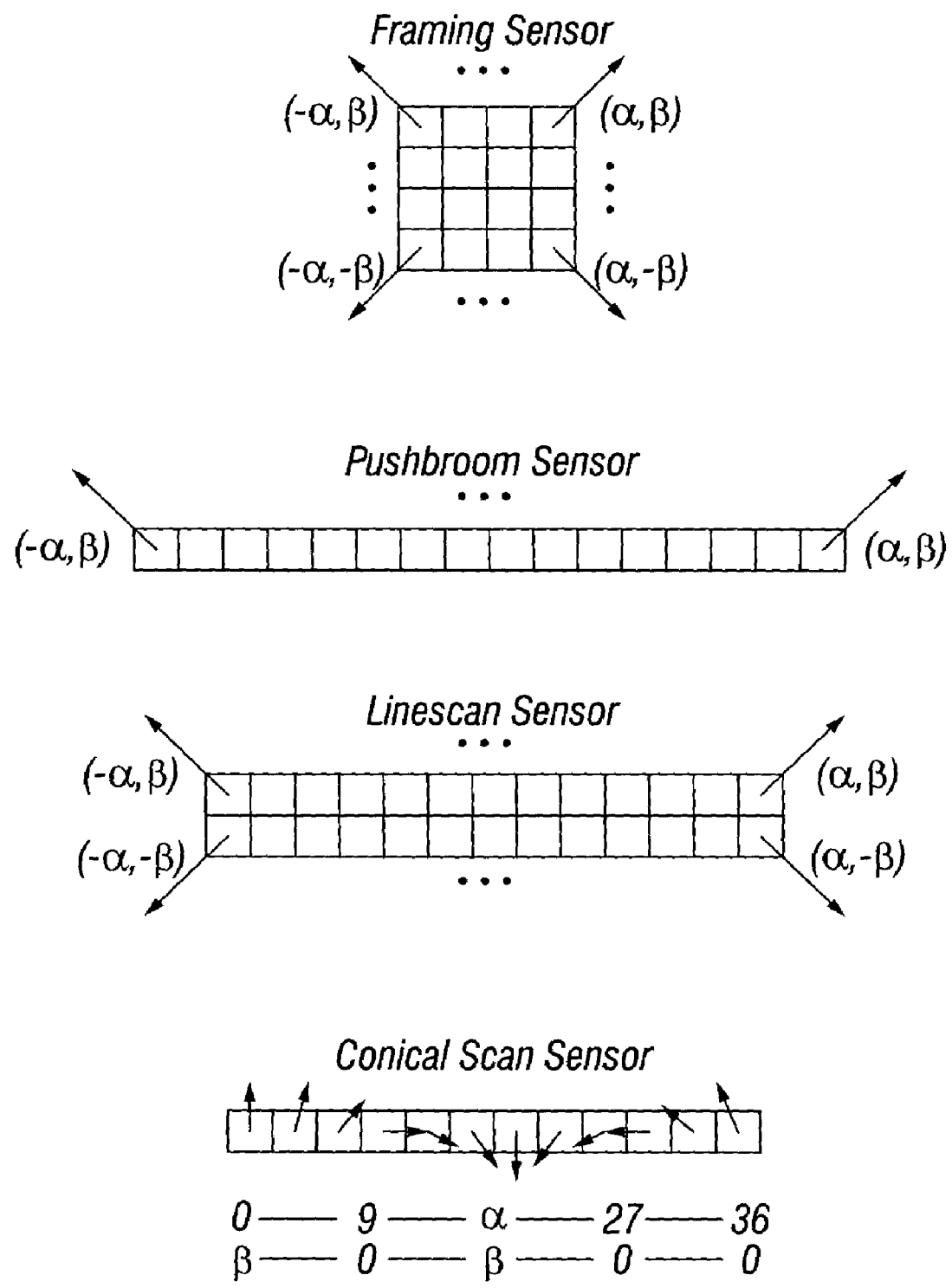
FIG. 8 is a schematic representation of coordinate TCF samples for various sensors.

Different transducers have different spatial characteristics. FIG. 8, for example, illustrates TCFs for four types of sensors including: a 4×4 framing sensor; a 1×16 pushbroom sensor; a 2×13 line scan sensor; and a 1×12 conical scan sensor. The TCF for the 4×4 framing sensor is similar to the arrangements of FIGS. 6 and 7. The alpha and beta values in the TCF for certain ones of the measurements are shown schematically as arrows labeled for the particular pixel. The orientation of the transducer reference system is chosen such that the set of coordinates chosen model the ambiguity space (if any) of each sample.

The pushbroom sensor has alpha and beta measurements for the sample look vector in the TCF shown as arrows. The line scanner shown in FIG. 8 has the alpha and beta values identified in accordance with the TCF of a line scanner. The conical scan sensor also shown in FIG. 8 has a model of the alpha and beta values described as a 1×12 array of arrows.

Figure 9:
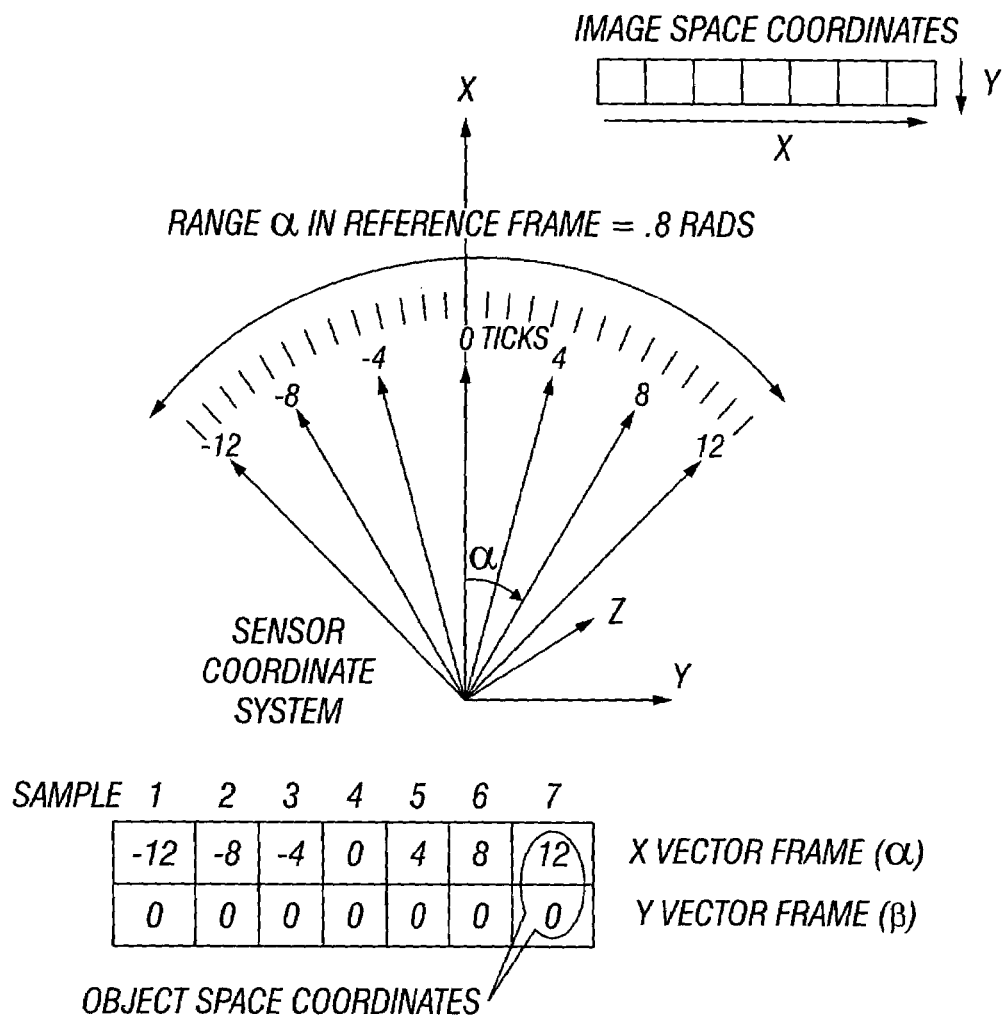
FIG. 9 is a description of spatial and timing data for a line sensor.

The values in a coordinate model provide a common way to describe these different spatial ambiguities. The range of one dimension is divided up into a specified number of equal distance intervals called ticks. FIG. 9 illustrates an example of a simple two-dimensional coordinate model for a 1×7 sensor. Each tick represents an interval in a coordinate model. The ticks allow the range of the coordinate to change without changing the tick count for each sample.

In Table II, the model for each sample 1–7 is shown in object space coordinates α and β for corresponding Image Space Coordinants.

TABLE II

| Sample | 1 | 2 | 3 | 4 | 5 | 6 | 7 |
|---|---|---|---|---|---|---|---|
| Image Space Coordinate x | $x_1$ | $x_2$ | $x_3$ | $x_4$ | $x_5$ | $x_6$ | $x_7$ |
| Image Space Coordinate y | $y_0$ | $y_0$ | $y_0$ | $y_0$ | $y_0$ | $y_0$ | $y_0$ |
| X Vector Frame A (Ticks) | −12 | −8 | −4 | 0 | 4 | 8 | 12 |
| Y Vector Frame B (Ticks) | 0 | 0 | 0 | 0 | 0 | 0 | 0 |

Figure 11:
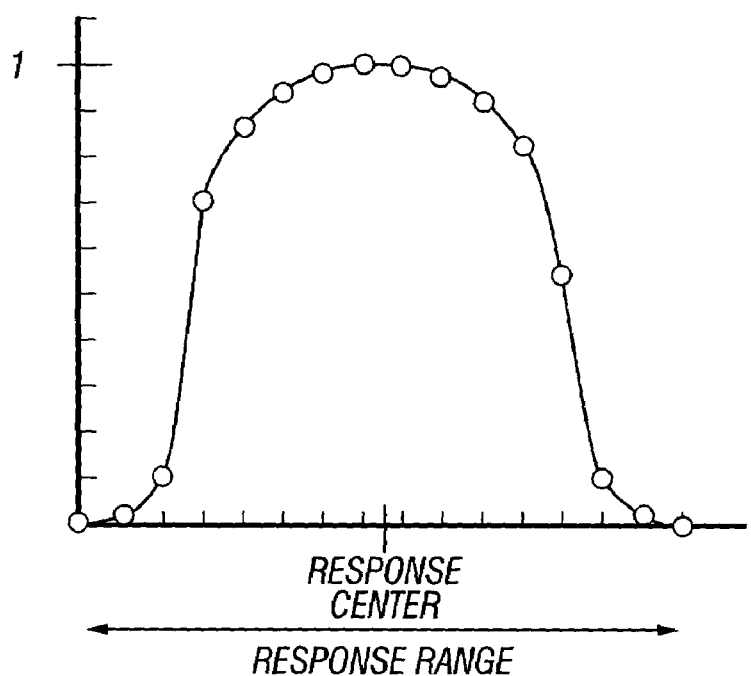
FIG. 11 is a description of the response spectrum of a sensor over its response range.
Figure 12:
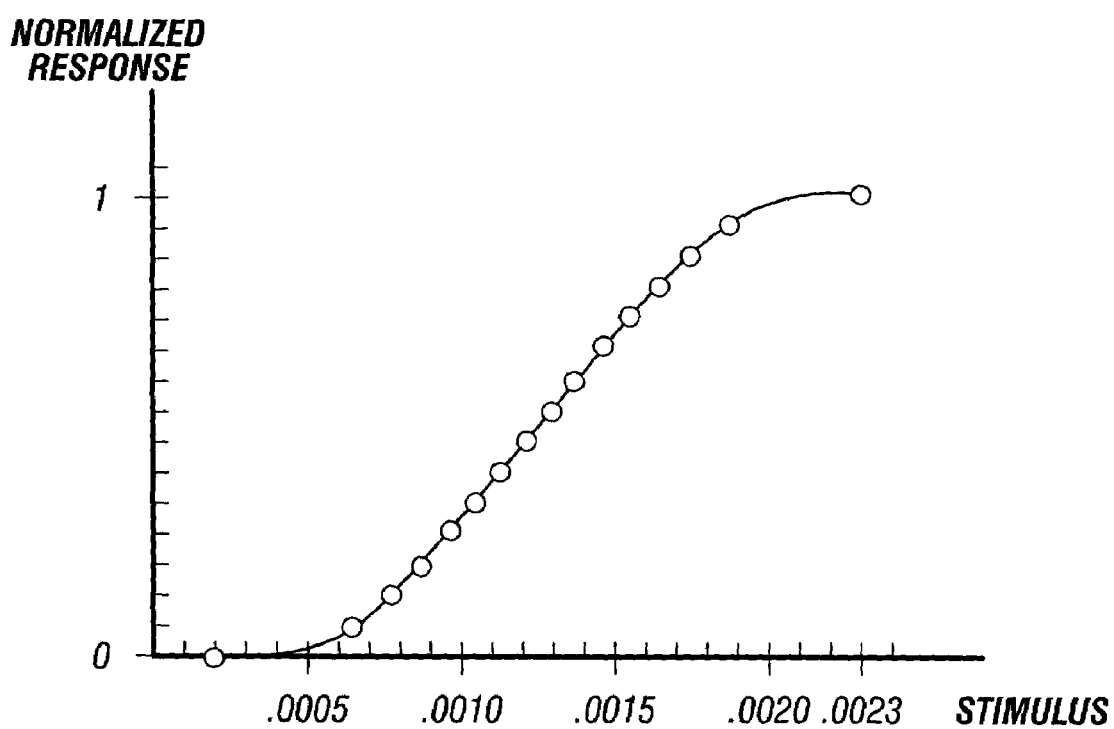
FIG. 12 is an illustration of the stimulus-response transfer function of an exemplary sensor.

Note that the sample image space coordinates and vector frame α and β have the same TCF configuration for a 1×n sensor.

vary over a range. The curve in FIG. 11 illustrates this characteristic. FIG. 12 illustrates a response of a pixel or detector compared with the stimulus. In other words, the response is a function of the stimulus and must be taken into account. The correction factor for each pixel can be characterized by using a TCF_model of the transducer.

The temporal model defines the relative time delays or offsets of each sample within a TCF relative to the first sample. The temporal model uses the TCF. Like the coordinate model, the values in the temporal model are given in time intervals also referred to as ticks. Table III illustrates an example of a two dimensional temporal model using time ticks.

TABLE III

| Sample | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 4 × 4 Scanning Sensor (Ticks) | 0 | 0 | 0 | 0 | 0 | 0 | 0 | 0 | 0 | 0 | 0 | 0 | 0 | 0 | 0 | 0 |
| 4 × 4 Pan Line Scanner (Ticks) | 0 | 0 | 0 | 0 | 1 | 1 | 1 | 1 | 2 | 2 | 2 | 2 | 3 | 3 | 3 | 3 |
| Line Scan Sensor (1 × 15) (Ticks) | 0 | 1 | 2 | 3 | 4 | 5 | 6 | 7 | 8 | 9 | 10 | 11 | 12 | 13 | 14 | — |
| Push Broom Sensor (1 × 15) (Ticks) | 0 | 0 | 0 | 0 | 0 | 0 | 0 | 0 | 0 | 0 | 0 | 0 | 0 | 0 | 0 | — |

Figure 10:
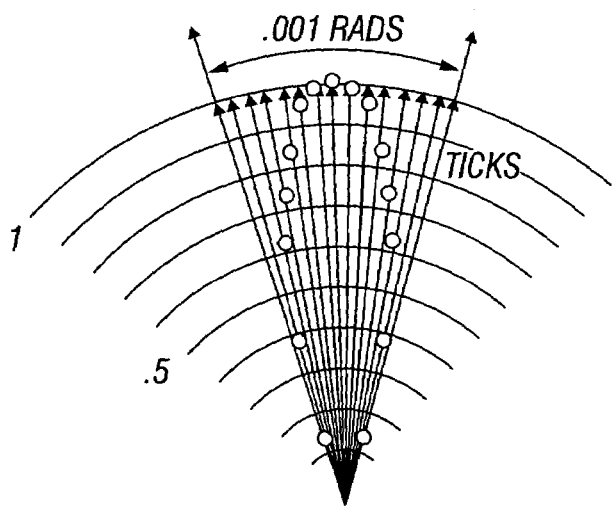
FIG. 10 is a description of the IFOV distribution for a sensor sample.

Functional models provide a way to represent functions. For example, the Instantaneous Field of Measurement (IFOM); the input/output transfer function (TF); and the frequency response are illustrated in FIGS. 10, 11 and 12 respectively. In FIG. 10, the response characteristic for a pixel element varies over the IFOV, and this variation is characterized as a value over a selected number of spatial ticks. It should be noted that the distribution of spatial and timing coordinates do not need to create symetrical rectagular arrays. The distribution of samples may be random in either space or time or both.

FIG. 11 is a normalized response function showing frequency response over a norminal bandwidth. FIG. 12 shows the normalized input/output transfer function over a range of stimuli. In each case, the data representing IFOV Response, frequency response and I/O response may be expressed in terms of the TCF for each sensor element (i.e. may vary as a function of a sample position with the TCF).

The invention thus provides a means for not only modeling the sample measurements, but also provides a means for modeling the various characteristics associated with those transducer measurements. A sample has a set number of measurements. Each measurement has an arbitrary number of properties and characteristics. For the invention, properties are simple name-value pairs e.g. frequency—Hz; angle—radians; volume—db; color—yellow and the like.

Characteristics are a combination of related properties. Characteristics may also include a curve, such as a simple sequence of numbers that maybe interpreted as a graph or curve. These curves represent variations inherent in measurements. In a camera, for example, depending on the position of the pixel with respect to the central axis, the sensitivity of the pixel may be higher or lower than a nearby pixel. Alternatively, the frequency response of a sensor may Functions or curves can be described by using a numeric function model or f_model. The range and/or endpoints of the independent variable comes from the calling element for the t_model. The f_model contains the set of data points representing the dependent variable spread linearly or logarithmically across the range of the independent variable. There may be one or two independent variables such that two or three dimensional functions can be modeled.

In a framing sensor such as shown in FIG. 6, all samples of a TCF are taken simultaneously, that is, there is no time offset between the first measurement in a sample and any other measurement in a sample in the frame. Accordingly, the temporal model of the framing sensor is represented by a 4×4 matrix of zeros in each of the boxes.

FIG. 6 also shows a pan scan sensor, where each sample in a line is taken at the same time. The second, third and fourth lines are sampled on later ticks. As shown, the first line is at tick time zero (0) and lines 2, 3 and 4 are on successive corresponidg ticks (1), (2), and (3) respectively, as illustrated by the numerals inscribed in the boxes. It should be noted that tick increments can and should be much faster than the increment between samples so that nonlinearities in timing can be characterized.

For the 1×15 push broom scanner, as illustrated in FIG. 6, the samples are taken at the same time tick zero. Thus the zeros are inscribed in all of the boxes. For the 1×15 line scanner in FIG. 6, the measurements are taken on successive ticks, hence the numbers 0, 1, 2 . . . 14 inscribed in the boxes.

The TCF is comprised of a set number of samples. Each sample is comprised of a set number of measurements. For instance, a camera may have 1000 by 1000 samples, called pixels, within its characteristic framework. In the example, the 1000×1000 samples makes an image having 1 million pixels (or 1 megapixel). If the camera is a black and white camera, then each sample has one measurement that may be a gradient of black, e.g. 256 grey scales. If the camera is a color camera, then each sample has three measurements, one for the gradient of cyan, magenta and yellow, or red, green, blue. In either case, the samples are contained in the TCF, and there will be a sample of 1 million samples Each sample within the TCF has a corresponding coordinate, time and sequence to describe its relative or internal spatial orientation, its internal or relative timing relative to other samples within the TCF, and its sequence order in the transmission stream such that it can be sorted into its internal sample sequence. For example, for the black and white camera, the data will be sent in a string of binary data. The data may look like a string of numbers *; *; *; . . . This data string represents, for example grey scales which follow the TCF of the sensor If the device is a color camera, which has three measurements, for example Red (R); Green (G); and Blue (B) for each sample, the data will be sent by interleaving the binary measurement from each measurement. The data will be in groups of three measurements which have the form: *, &&&, %%%; ***,&&&,%%% . . .

Figure 13:
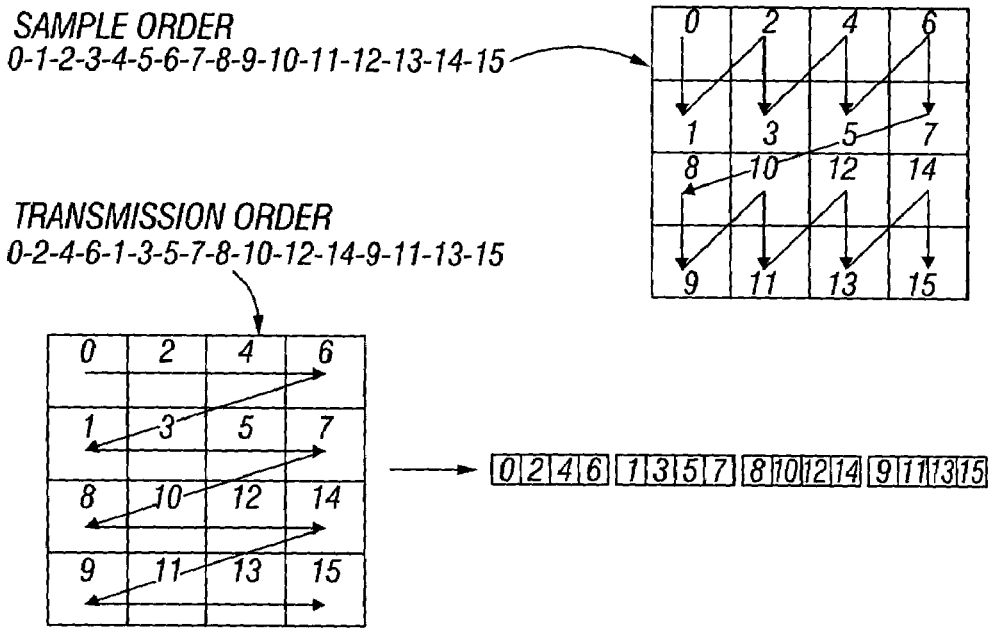
FIG. 13 is a schematic illustration of a sample order for a sensor and a corresponding different transmission order for the same device.

The sampling order is the order in which the samples are taken. The sequence of samples can be any desired order. The sampling order is given by the spatial or temporal orientation of the samples within a TCF. This order may be disturbed during the serial transmission of the data. The order in which the samples are transported shall be the same as the order in which the timing and coordinate TCFs are transported. To retrieve the original order, the coordinate TCFs can be sorted to retrieve the spatial order. The original temporal order will then result from the similar sorting of its TCF. To facilitate the sorting, a TCF will be used which gives the intended numeric position of each sample in the transported TCF (FIG. 13).

The order in which transducer samples of a measurement TCF are transported through a communication channel i.e. Sequence TCF, may vary greatly and may not always represent a left-o-right, top-to-bottom, front-to-back scan of the TCF structure. One way to organize the data such that the data is organized spatially correct is to sort the data samples according the the coordinates of the coordinate TCF's. This sorting although possible may be a computationaly intensive task. To facilate the sorting a sequencing TCF is introduced (FIG. 13.).

One way to describe the sequence is to order all of the samples in their intended order and give them a serial sequence number using the left-to-right, top-to-bottom, front-to-back sequence. This organization has nothing to do with the temporal order in which the samples were acquired. It does relate to the relative spatial organization of the samples within the TCF (i.e. coordiante TCFs). There may be situations where the intended organization of the data is not orthoginal (e.g. a random spatial distribution). In these situations it may be benefitial to assign a coordinate to the intended position of each sample. If the TCF is a 2-dimensional structure then two sequencing TCFs would be used, one sequence TCF for each coordiante. One sequence TCF would indicate the column position of the sample and the other sequence TCF would indicate the row position of the sample. Samples do not need to be positioned at every column-row orderd pair. If the spatial structure of the data is not orthoginal, then the non-orthoginal structure shall be described using an all inclusive orthoginal coordinate space. Known approaches to the sequencing TCF implement the serial sequence number or the coordinate sets to represent the row, column, plane position of the samples.

Encoding is a characteristic that must be defined for each measurement. The encoding characteristic defines the bits; the data type; the units; and the range properties of a measurement. The encoding characteristic provides the information required to allow applications to parse data within a cluster. The model can provide any number of characteristics for a particular measurement. Some characteristics include frequency response, instantaneous field of view and gain.

The model can specify dependency, which is defined as a condition where the value of a property is dependent upon another property, or is dependent upon a measurement value generated by another transducer. As indicated above, measurement is specified or identified as a name-value pair. To specify a dependency, on the other hand, a property has a name-dependency identifier e.g. gain-temperature, and the like, rather than a name-value pair. The invention uses the dependency identifiers to define the relationship between transducers to thereby define a system.

A system is an arbitrary set of transducers. The invention characterizes a system by providing the individual models of the transducers and then specifying the interdependency of the properties of the transducers using dependency identifiers.

As an example, a first transducer may have variable gain dependent upon temperature. A second transducer may be a gain sensor. In a system incorporating these transducers, it would be necessary to define the properties of both transducers, and specify that the gain characteristic is dependent upon another value (measured by the gain sensor). That is, a property in the gain characteristic would have a dependency identifier; and an association between the gain characteristic of the data from the gain sensor would be specified.

In accordance with the invention, the interdependencies are specified outside of the sensor models themselves. This approach enables system specifications to incorporate sensor models without changing the sensor models. That is, systems can utilize "plug and play" sensor models.

To minimally characterize a transducer one must answer the questions of "what" is the measurement; "where" in space does the measurement relate to; and "when" in time did the measurement occur. The where (space) and when (time) characteristics are answered by a combination of the interior and exterior orientation of a transducer. It should be noted that the interior orientation is only applicable for remote transducers. There is no geometric interior orientation applicable to in-situ transducers.

The transducer orientation characterizes the space-time relationship or geometry of the transducer data. The interior and exterior orientation of a transducer complements each other to give a complete space-time relationship of the data. The interior orientation is an orientation that remains constant with respect to the transducer reference frame independent of transducer position, attitude, motion or time. This orientation accounts for any of the scanning mechanics or the space and time relationships between the samples within the transducer characteristic frame. The external orientation characterizes the position and attitude and timing relationship of the transducer reference system with respect to an external reference system. The world reference system is an external spatial reference system that will be the common reference system for all geo-spatial data (e.g. ECEF reference system).

Figure 14:
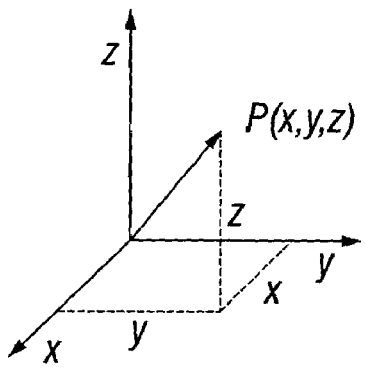
FIG. 14 is a depiction of a basic Cartesian coordinate system.
Figure 14:
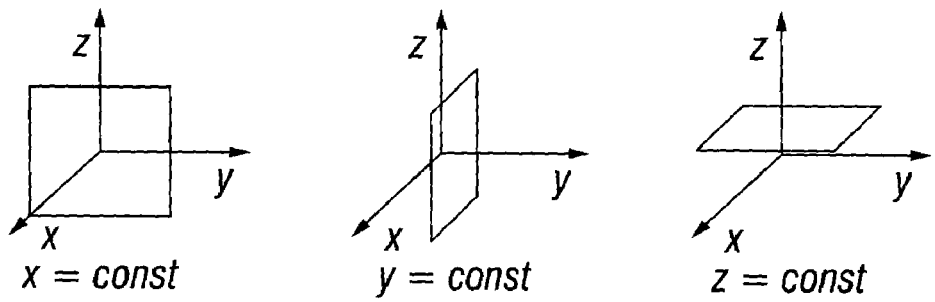

A system of Coordinate and Reference System is used throughout this discussion. FIGS. 14 and 15 respectively show the Cartesian and polar coordinate systems used to describe coordinates.

FIGS. 16 and 17 show two reference systems used in this discussion. FIG. 16 shows an Earth Centered Earth Fixed (ECEF) coordinate system (further defined by WGS-84). FIG. 17 shows a transducer reference system. If a platform reference system is required, a transducer shall be assigned to it so that it can be measured. There is no assigned orientation of the x, y, and z axis to the transducer. Any orientation may be used, depending which orientation works best for characterizing the interior orientation of the transducer data. The description of the interior orientation may be expressed in terms of selected system coordinates (x, y, z, $\alpha$, $\beta$, r). These coordinate assignments may be used to describe the interior orientation of the coordinate system axis to the transducer data.

Figure 18:
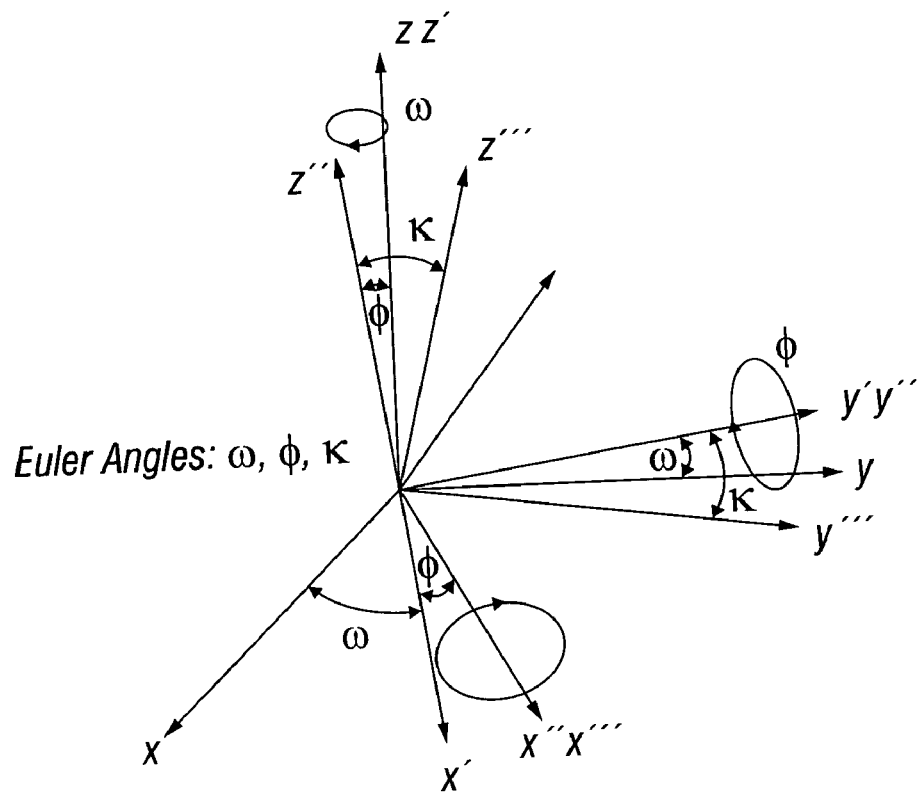
FIG. 18 is a depiction of coordinate transformations in euler angles.

FIG. 18 shows the convention used for determining the Euler angles ($\omega,\phi,\kappa$) for rotation transforms. Particular attention should be made to the order in which the rotations ($\kappa$ then $\phi$ then $\omega$) are made when defining the orientation of a transducer relative to the external reference. The order is reversed when describing the oritation of the external reference system relative to the transducer reference system.

Key dependencies between transducers are position and attitude and their first and second derivatives. Position may be measured with Cartesian or spherical coordinates. The attitude is measured with $\omega,\phi,\kappa$ known as Euler angles.

Figure 19:
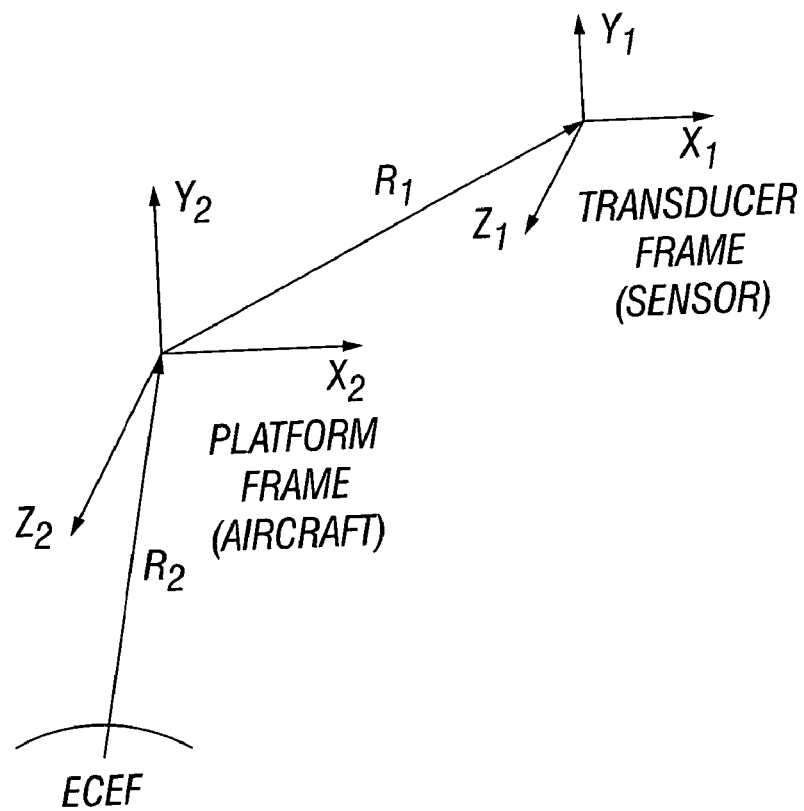
FIG. 19 is an illustration of an exemplary coordinate transformation.

FIG. 19 schematically illustrates an exemplary sensor S in coordinate frame F1 expressed as x1, y1, z1, secured in a platform (e.g. in an aircraft). A in coordinate frame F2 expressed as x2, y2, z2 by an arm of length R1. An IMU on the aircraft senses the attitude of the platform frame in coordinates $\omega,\phi,\kappa$; and a GPS senses the position of the sensors in the platform relative to the Earth. The attitude of the sensor S with respect to the IMU is given as a quantity derived from gimbol sensors Sx; Sy; Sz in frame F2 expressed as $gx_2$, $gy_2$, $gz_2$. Accordingly, all necessary coordinates are available. It is not unusual for the frames to have a selectable or time varying attitude which may be measured and recorded over time.

Using known coordinate transformations, the attitude of the sensor frame S may be fixed with respect to the position of the IMU and the position may be found relative to the GPS. The attitude of the IMU may be translated to the GPS position assuming the IMU and GPS form a rigid body. For example, the position dependency of (x1, y1, z1) of the sensor frame A with respect to the aircraft of frame A may be expressed as fixed numbers, such as (12.005, −4.452, 0.216) because the arm length R1 is fixed. These numbers represent the fixed positional difference, i.e. ((x1–x2), (y1–y2), (z1–z2)), between the origins of the frames F1 and F2.

Similarly, when the attitude of one transducer is determined (fixed) relative to another transducer, the attitude dependency of ($\omega,\phi,\kappa$) is specified as fixed numbers, such as (0.86, −0.86, 0.13). These numbers represent the difference angle between the axes of one transducer with respect to another transducer. Thus, the positional transformations define the relationship between coordinate systems for related transducer frames. If the attitude varies then the attitude dependency will retarget the appropriate sensor.

Positioning sensors are treated like any other transducer. This approach is an important concept of invention. Position dependency may be specified based on the value of a transducer measurement. For example, the attitude of gimbol sensors (Sx, Sy, Sz) may measure the attitude of a transducerf relative to the attitude of an IMU. The position of a global positioning system (GPS) sensor with respect to Earth Center Earth Fixed is dependent upon the position measurements measured by itself. In either case, the attitude position reading of a transducer is handled the same way as any other data. There are no exceptions. The only difference between the gimbol measurement and an image measurement, for example, is that the TCF of the gimbol is defined uniquely for the gimbol and the TCF of the image sensor is defined uniquely for the image sensor. Timing and sequencing may be different, but again, these are handled in accordance with the TCF of the sensor. All data models and identifieres follow or are layered on the TCF of the corresponding device. Therefore, the system has a uniform and generic process for handling and communicating information. In addition, because the data is accurately timed and sequenced, it is possible to relate the data of different transducers in space and time.

The following is a simplified example from FIG. 19 which is intended to illustrate how these interdependencies work.

Sensor S is a scanning sensor or camera in sensor Frame F1. Sensor S is attached to an arm of a given length R1. The arm is attached to an aircraft A, in a platform frame F1 in an aircraft A, with attitude measured by an IMU and position measured by a GPS. Sensor S2 (Sx; Sy; Sz) comprises roll gimbol encoders that measure the attitude of sensor S relative to the aircraft $gx_2$, $gy_2$, $gz_2$. Sensor S3 is global position system GPS that measures the position of the platform relative to an earth-center earth-fixed (ECEF) coordinate system. Sensor S4 is an inertial measurement unit IMU that measures the attitude of the aircraft relative to ECEF.

The resultant exterior attitude and positions are the result of individual rotations and translations of the coordinate frames.

Many transducers are in reality a system of transducers. A transducer system topology provides the fundamental descriptions of how all of the transducer data relates. Not all systems are alike so the system topology is described on a system to system basis. This specification defines four types of relations: Attached, Dangled, Position, and Attitude.

An Attached sensor is typically an in-situ sensor measuring other parameters to support its host sensor. The Attached relationship will be described in the attached sensor's nomenclature. An example of an attached sensor would be if one had a diagnostic sensor attached to the primary imaging sensor measuring another variable (such as vibration of temperature). An Attached element is empty and simply references another sensor. The presence of an Attached element means that the sensor referenced by the dependency element should be treated as if it had the exact same location and attitude as the sensor referenced by the Attached element.

The Attached relation is used to attach sensors to transducer characteristics which describe changing parameters about a transducer system, such as receiver gain. The Attached relation implies that there is a characteristic to "hook to". The sensor is measuring a changing parameter for that one of the transducer characteristics that TML models.

The Dangle dependency is like the attached dependency except that there is no internal hook to a transducer characteristic. The Dangle transducer simple hangs off of another transducer and provides additional measurement relating to the transducer as a whole. An example of a dangle relation would be a temperature measurement of a transducer's detector, to the vibration load on a particular transmitter.

The Position relation identifies the position of a transducer relative to the earth or another transducer. The Position can be a fixed location or it can be variable, where the position is measured by a sensor. The Attitude relation is similar to the position except the orientation of a transducer is described relative to the earth or another transducer. If the orientation is variable the orientation may be described with a sensor. The Position and attitude relations are the principal relations for determining the exterior orientation of any transducer.

The invention also provides a method for communicating data. In accordance with the invention, the transducer models are sent first followed the actual data generated by the transducers. The models enable applications to correlate the data of transducers by describing (1) what the data represents, (2) how to parse the clusters of data that are sent and (3) how to calculate the dependencies in the data, especially the dependencies of position and attitude.

Each transducer broadcasts data in clusters. The transducer model defines the size of the cluster. The transducer broadcasts these clusters at its own rate. Each cluster has a time stamp. The cluster contains either a set number of transducer characteristic frames (TCF) or a set fraction of a TCF. Each TCF contains a specified number of samples. The temporal model of the transducer specifies the time relationship between the time stamp of the cluster and the samples within a cluster. An application uses the temporal model to calculate the time of a specific sample within a cluster. The time stamp on the cluster represents the time of the first TCF in the cluster. If multiple TCFs are in a cluster the other TCF time stamps can be calculated by adding the TCF period to the time stamp. If a TCF is broken into multiple clusters all clussters shall have the same time stamp.

A system defines that the properties of certain transducers are dependent upon the values of the data created by other transducers. Most notably, the position of one transducer will be dependent upon the readings of a position sensor. Since each transducer or sensor broadcasts at its own rate, there will not be samples from two transducers with the exact same time stamp. The resultant value for a transducer is calculated by interpolating the values from the other transducer.

Figure 20:
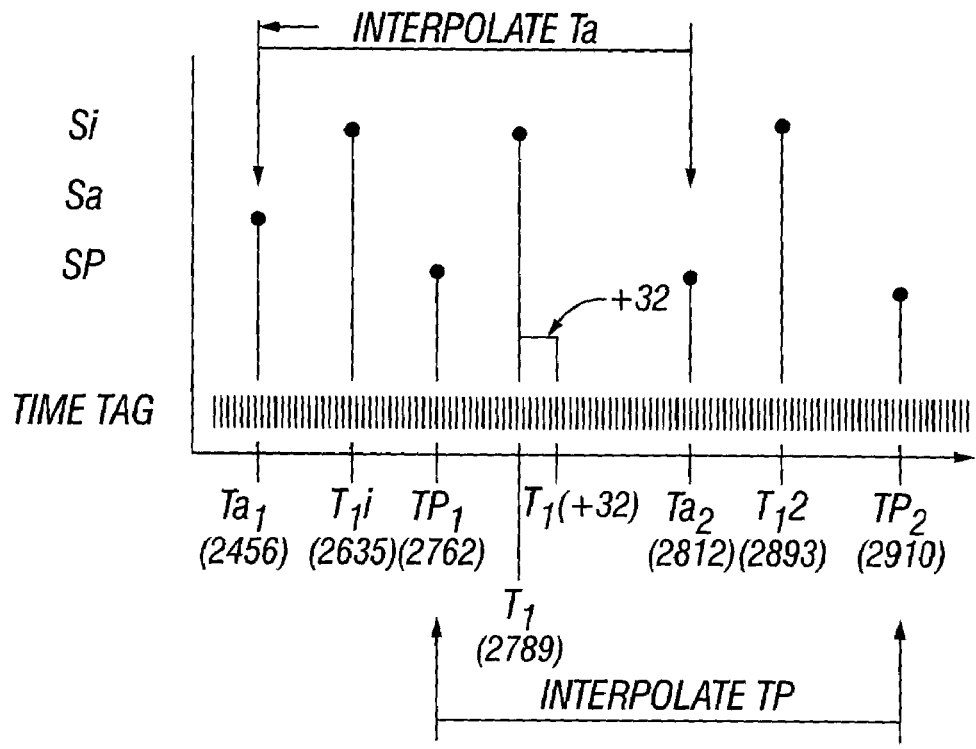
FIG. 20 is an illustration of an exemplary interpolation.

The following example is intended to illustrate how to interpolate these dependent values in a system of three transducers. The system includes an attitude sensor Sa; a position sensor Sp; and an image sensor Si. The system broadcasts the following clusters depicted in FIG. 20 with the specified time stamps.

Tai-2456, attitude (pitch, roll, heading)
Ti1, 2635, image
Tp1, 2762, position (latitude, longitude, altitude)
Ti2, 2789, image
Ti, (32nd pixel)
Ta2, 2812, attitude
Ti2, 2893, image
Tp2, 2910, position.

In this example simplified to illustrate the concept, the image sensor has 100 TCF in each cluster. Each TCF is one tick later in the time stamp. It is possible to calculate the point on the earth to which a set of pixels (samples) in a picture is pointing. For example if the first sensor image is initaited at time stamp 2789, as shown, and the 32nd pixel in the cluster has time stamp 2821, i.e. 2789+32 (one tick per pixel). The time in quesiton i.e. of the 32nd pixel Ti is therfore: 2821.

In order to calculate the postion (latitude, longitude and altitude), an interpolation is performed based on the readings taken at time stamps Tp1=2762 and Tp2=2910 which bracket the time T–2821.

The position at time T=2821 is calculated by interpolating between time stamps for Tp1=2762 and Tp2=2910.

Likewise, the camera attitude (pitch, roll, heading) for the time in question, i.e. T=2821 may be intrpolated from the attitude readings taken at Ta1=2456 and Ta2=2812 from the data shown above.

The invention may be described as a method and apparatus for acquiring in a universal way transducer data from the plurality of diverse sensors or emitters. The method is particularly useful for efficient and accurate real-time capture and observation of the data. The invention facilitates real time capture and utilization of the data because the data is presented in such a way that pertinent information is modeled in accordance with the Transducer Characteristic Frame (TCF). As a result, the data follows a scheme which is uniform and and self consistent, and which permits the system to readily accept new forms of transducers as they become available without significant modification of the system. In short, the system accepts transducers as so called "plug and play" devices.

The invention allows for accurate and precise acquisition of transducer data which may be readily processed, interpreted, archived and retrieved with known accuracy and precision and without corruption of the acquired data.

The universality of the data format allows for the importation of the data by standard communications protocols.

The invention compartmentalizes the information associated with each transducer sensor in such a way that it is possible to collect the information with reduced overhead.

Transducers have diverse characteristics tailored to function or performance requirements. However, any transducer may be characterized in accordance with the model described herein which exemplifies the essential characteristics of the transducer. The TCF is only part of the characterization. Thus there is a self consistency of all models of the data for any transducer.

It should be understood that the sensor response is fully still characterized by the "what", "where", and "when" characteristics. The "what" characteristics describe: what is being measured; encoding and formatting rules are used to describe the measurement; the units of the measurement; the uncertainties (absolute and relative) of the measurement; the frequency response of the detector; the input-output transfer function; and the instantaneous field of view.

The "where" characteristics describe where (spatial position) in space the measurement corresponds. The spatial relationship of the sensor with respect to the platform is characterized by the sensed orientation of the platform and a time tag. If one wishes to characterize the position of the platform relative to some other location, for example, an earth surface station, the position and orientation of the platform relative to the earth is sensed and time tagged.

The "when" characteristics describe when in time the measurement corresponds. A time tag (tick) maintains relative timing between samples and frames, and an absolute time can be measured with a time sensor measurement which has a relative time tag associated with it. Time tags give relation timing between TCFs. The timing TCF gives relative timing within the TCF and the world clock sensor provides absolute time. Time tag in start tag of world time sensor correlate world time to system time tag.

If one wishes to know the relationship of a sensor relative to some remote location, it is necessary only to look at the various data and correlate the information by interpolation. In other words, the sensor data may be fused or summed with the platform data; and the platform data may be fused with the earth station data. In short therefore, it is only necessary to collect "what"; "where" and "when" data necessary to relate the components in time and space. It is not necessary to calculate the various relationships among the components. Accordingly, the raw data for each sensor is collected independently of other sensors, The arrangement therefore simplifies data collection because complex calculation steps are not performed prior to collecting and characterizing the data. The arrangement thus avoids problems associated with data corruption, because data is preserved as it is taken without modification.

In FIG. 19 the chain of relationships is traceable back to some desired reference point e.g. an Earth Centered Earth Fixed Reference ECEF system. All sensors should be traceable to ECEF. As shown, the position of the aircraft A relative to the Earth is defined by the earth platform vector $R_2$, which can be characterized as a absolute radial distance with an azimuth and elevation. Alternatively, the vector 2 may be characterized by Cartesian or spherical coordinates.

As can be appreciated, any consistent coordinate system may be employed to characterize these data. Accordingly, it possible to know in real-time the position/attitude with respect to the sensor relative to the ECEF reference system. The above described characterization of sensor data transforms one reference system, for example, the reference system of the sensor to an ECEF reference system.

In order to model the sensor data and represent it as a temporal model, each sample must have associated with it the time when it was acquired and what was being sampled at that instant. For example, in the sensor data frame, there will be associated data in similar arrays to describe the timing and spatial data for each sample. The values in each corresponding location of the timing tables relate to the relative time that the sample was acquired in relation to the other samples in the frame. The sampling rate within a TCF as well as the rate at which TCF are acquired may be quite different for different sensors.

Figure 21:
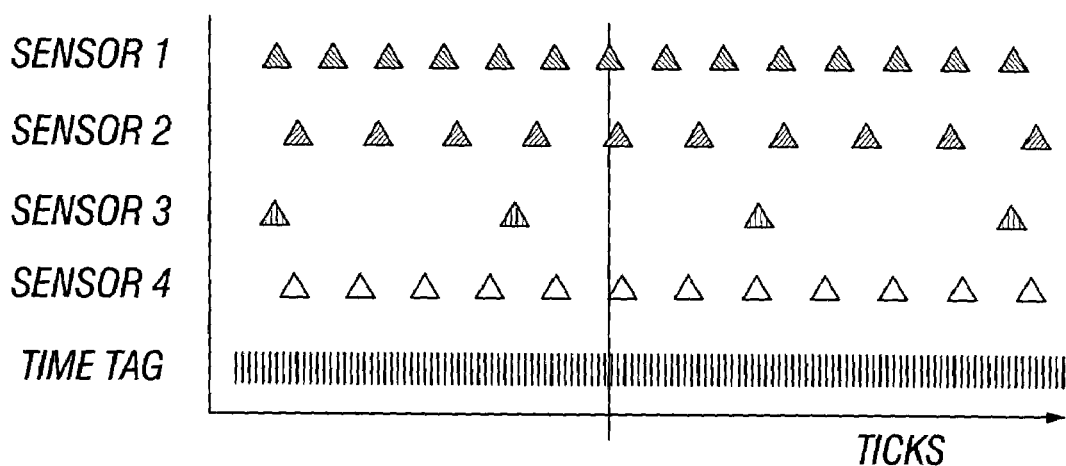
FIG. 21 is an illustration of exemplifying the relationship of sensor data taken at different rates.

FIG. 21 illustrates this concept. Sensor 1 data occurs at a higher frequency and as different times than sensors 2–4. this is because it may be necessary to receive data which changes frequently, e.g. image data more often than condition data, e.g., temperature. According to the invention, all data is time tagged so that the relationship of the data from any Sensor may be related temporally to any other sensor. As previously noted, the data for any sensor may be interpreted to relate it to a time tagged sample of any other sensor.

As noted above, it should be understood that the sampling order and transmission order maybe very different. Data may be acquired in a certain sequence and transmitted in yet a different sequence and the received data maybe unscrambled at the receiving station in order to reconstruct the image or data. In this connection the spatial data, i.e. spatial vectors, may likewise be unscrambled using the a-priori information characterizing the sensor. For example, if a series of vector values are transmitted in a transmission order, the receiving station, being responsive to the vector values, may unscramble the data by comparing the vector information transmitted with the vector map of the sensor frame. In other words, each spacial vector defines or characterized the corresponding sensor sample, including the location of the data in the sensor frame, and thereby orders the data accordingly. Indeed the transmission of sensor response samples may be random, but as long as the corresponding spatial coordinates (i.e. vectors) are scrambled in the same order as the sensor response samples, the sampling order can be recovered by sorting the vectors in the spatial frame, then sorting the response frame in a similar manner.

Figure 22:
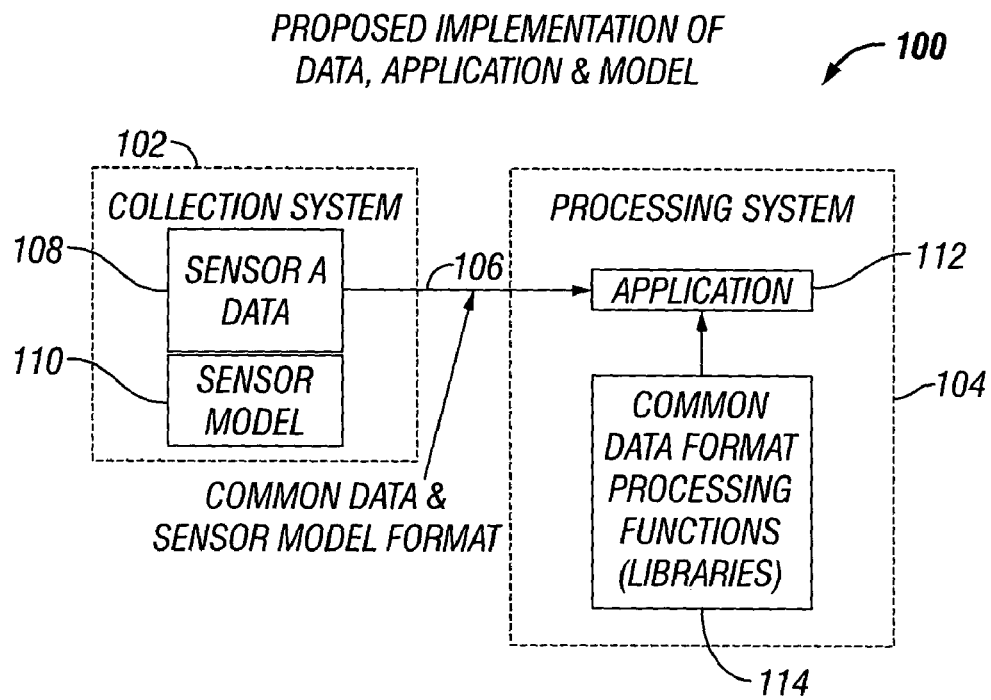
FIG. 22 is a generalized schematic block diagram of the overall system according to the invention.

FIG. 22 generally illustrates the overall system 100 according to the invention, employing a collection system 102 and a processing system 104 coupled over a link 106. The collection system 102 includes one or more sensors producing data 108. Each sensor has a corresponding model 110. Data generated by the various sensors 108 is transmitted over the link 106 in a common data and sensor model format. The processing system 104 includes an application module 112 which receives and reads the data. The application module 112 is responsive to a library 114 of common data format processing functions. Accordingly, all of the sensors may be modeled in the same way and their outputs may be processed and interpreted in a common and uniform way. The uniform modeling of all data of a transducer, in effect, constitutes preprocessing of data in such a way that it is self consistent and uncorruptable.

Figure 23:
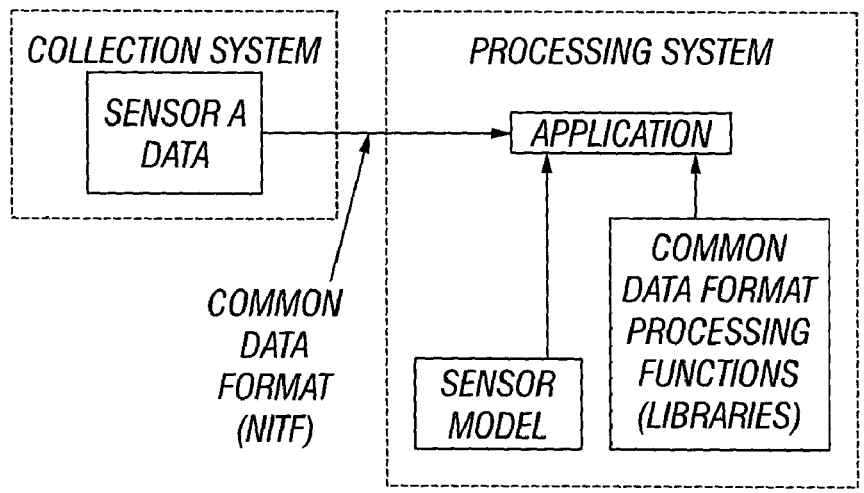
FIG. 23 is a generalized schematic diagram of a conventional system.

In contrast, FIG. 23 shows a conventional arrangement. In this arrangement, sensor data is collected in a common format. Typically this is a proprietary format which does not include a model of the sensor. The sensor data is sent to the processing system, where the application employs a unique sensor model to process the data. The disadvantage is that each time a new sensor is developed, a new model must be incorporated into the system. Whereas, with the invention, the models are transmitting with the data and the sensor consistent. In conventional systems, processing occurs concurrently with or before modeling. Therefore, the data is not self consistent and may be corrupted before it is archived.

Figure 24A:
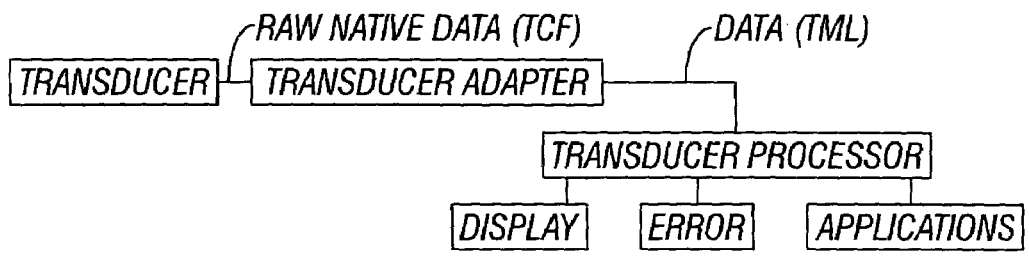
FIGS. 24a–24c are schematic block diagrams of various embodiments of a generalized system according to the invention.
Figure 24B:
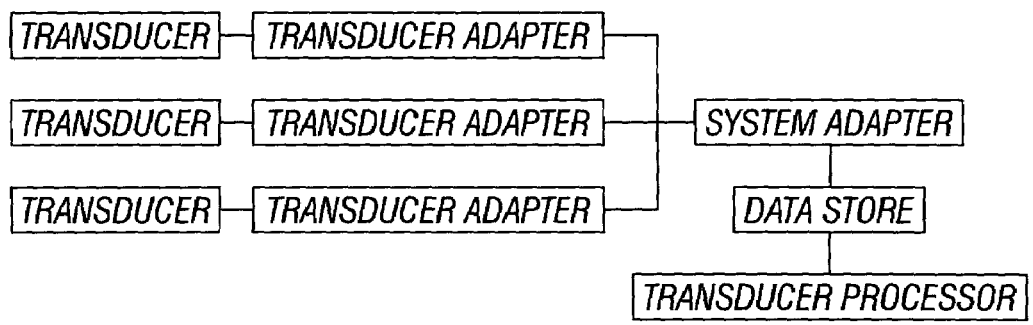
Figure 24C:
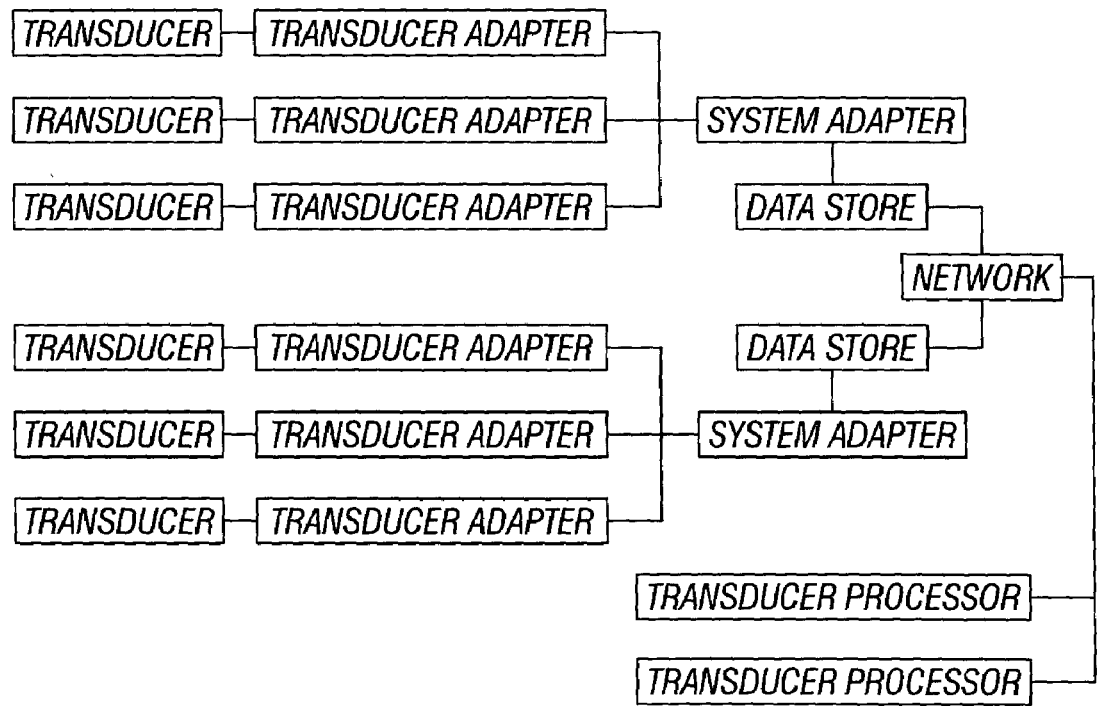

FIG. 24 illustrates an airborne collection system 120 in which the data from sensors 122-1 . . . 122-n is formatted in data formatter 124 and transmitted over the link 126. The airborne system also includes ancillary data means 128-1 . . . 128-n for each corresponding sensor 122-1 . . . 122-n. The ancillary data means may be tailored for the corresponding sensor model. The ancillary data is sent along with the sensor response in a data stream 128 as illustrated. The transducer data description may likewise be transmitted at the commencement of the transmission.

Figure 25:
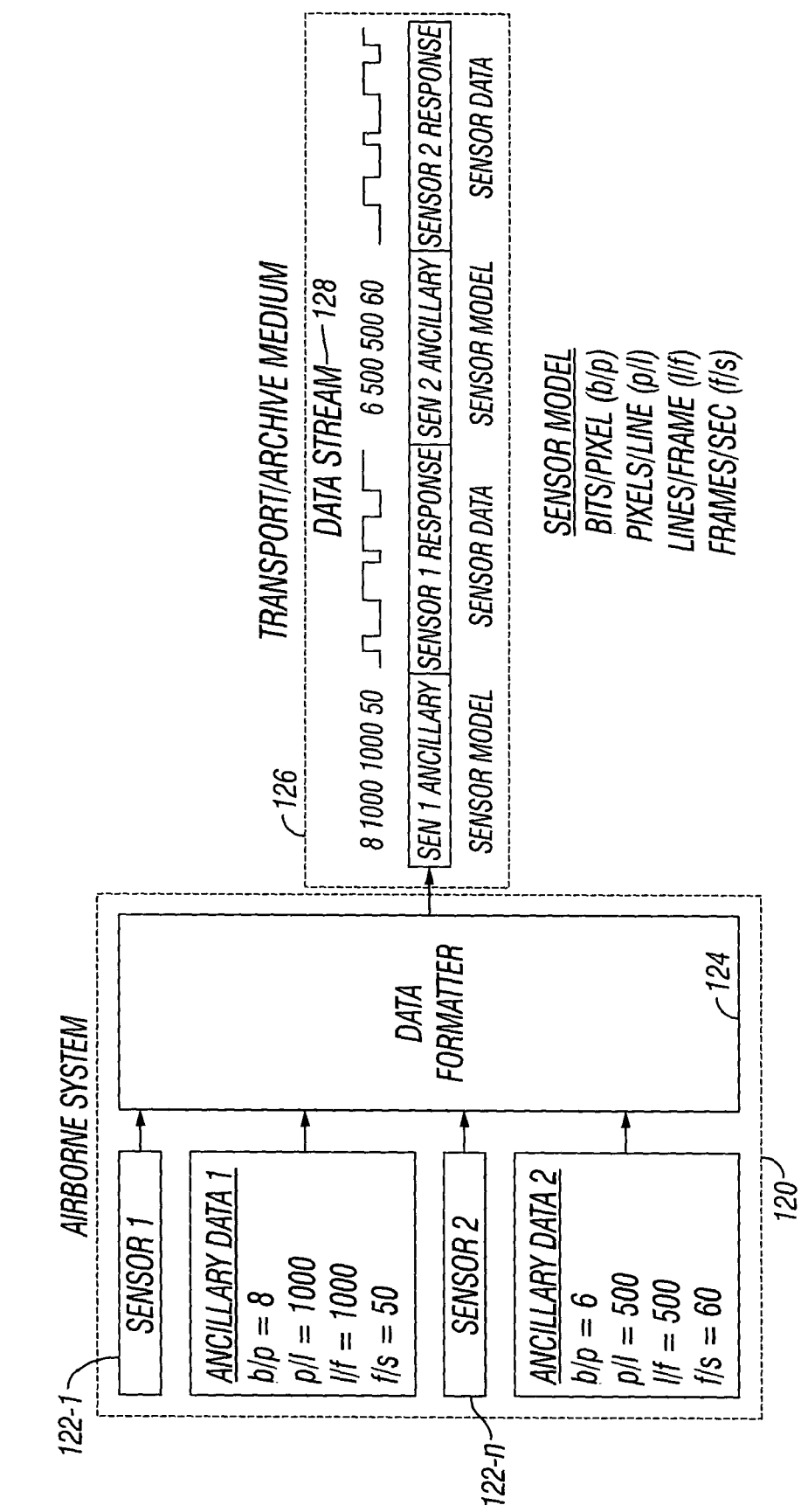
FIG. 25 is a schematic block diagram of an airborne capture and transmit system according to the invention.
Figure 26:
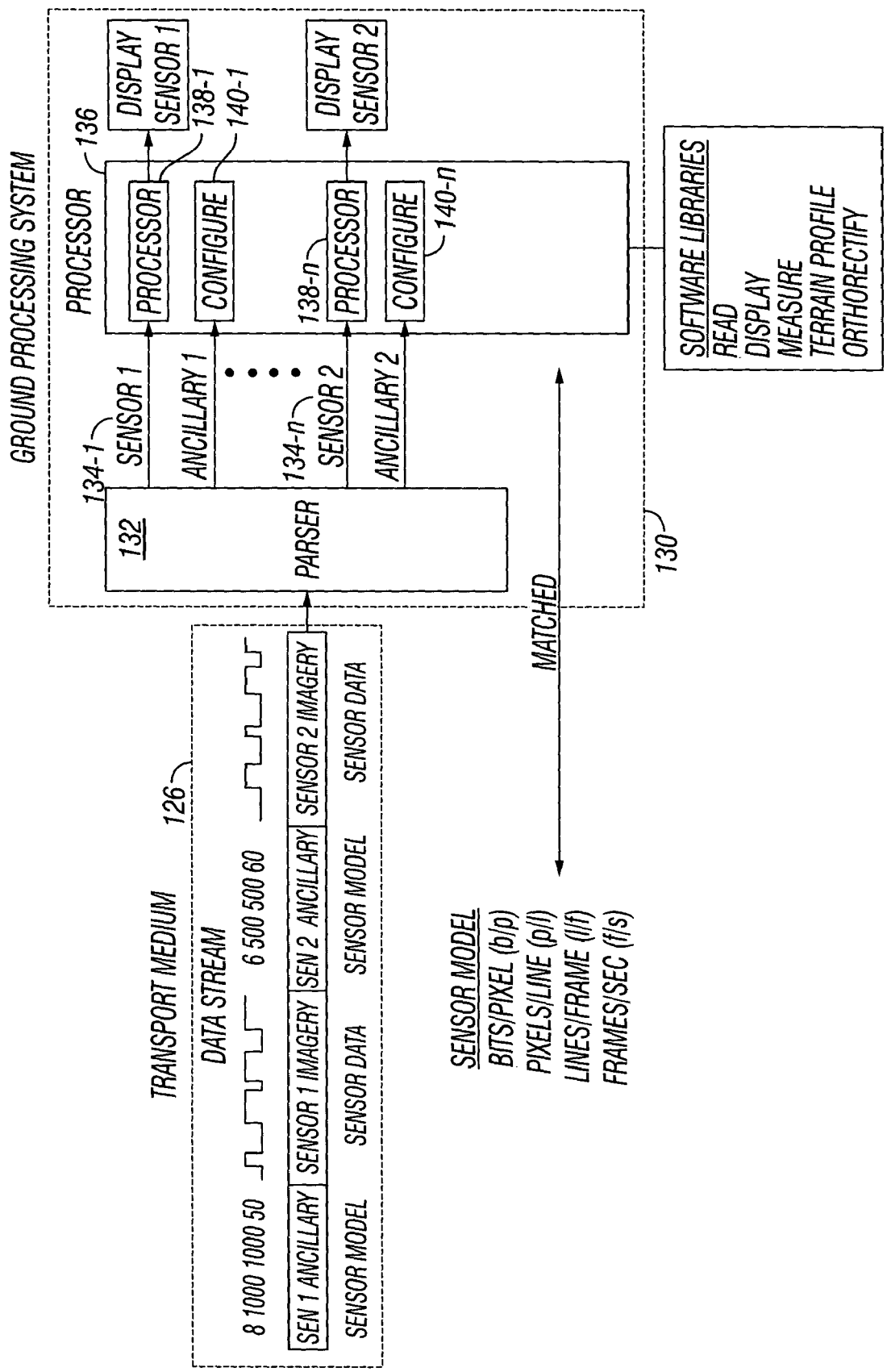
FIG. 26 is a schematic block diagram of a terrestrial or ground receive processing and display system according to the invention.

FIG. 25 illustrates a ground or terrestrial receive, process and display station 130 in which the data carried over link 126 is coupled to input parser 132 which separates or demodulates the data for each sensor into separate streams 134-1 . . . 134-n respectively. The streams include the sensor data and sensor data description for each sensor. The data is coupled to a processor module 136 including a processors 138-1 . . . 138-n for processing the sensor data for each sensor; and a corresponding configuration module 140-1 . . . 140-n for processing the sensor data description in order to properly configure the processor handling the sensor. Each processor 138-1 . . . 138-n may be coupled to an appropriate display 142-1 . . . 142-n. It should be understood that the various processing, display and configuration modules may be combined in an appropriate workstation as desired.

As illustrated, the sensor data description is appropriately matched in the processor 136 for the sensor data to be processed. The software libraries, 142 are adapted to facilitate the universal interpretation of sensor data in the processor.

The model of the sensor system topology describes the relationship of the various sensors used in the multi sensor system. This modeling provides a cohesive picture to fuse all of the data together for the various sensors on board a platform. This model describes the chain of sensors and what parameters, if any, are modified by previous sensor measurements in the chain. For example, a detector look direction relative to a transducer is modified by the gimbol angles relative to the internal measurement sensor of the platform and the latitude of the platform relative to earth. This sensor environment data enables vectors to be manipulated and common reference frames to be converted into other common reference frames.

According to the invention, only appropriate parameters need to be captured such that the measurement errors can be accumulated throughout the chain to give the processes indication of resultant measurement error.

From the foregoing it can be seen that it is possible to tie each sample and the sensor response frame to each sample in the timing and spatial frame. Accordingly, each sample can be mapped to any surface with relative ease. The arrangement provides for rapid targeting based solely on data collected from the sensor system.

In accordance with the invention the sensor data and metadata to describe the sensor are packaged in a form for transport to a remote location or to an archive. The shell is generic and uses a compatible markup language as a carrier for the data elements of the model, e.g.: transducer markup language (TML). The shell does not add significant overhead to the basic data elements.

The following is a description of the transducer markup language (XML) employed in the invention. The description has the material subdivided into a series of sections with section headings followed by TML text and, where appropriate, followed by explanatory text discussing the feature of interest.

Stream Header

```
<!ELEMENT transducerML (system, (system_update*|data*))>
<!ATTLIST transducerML
    version CDATA #FIXED "0.9beta">
```

The TML document represents a stream. The opening tag initiates the stream. A closing tag terminates the stream. The first element in the stream should be a system element. The remainder of the stream is any sequence of system_update elements and data elements.

```
<?xml version="1.0"?>
<transducerML version="0.9beta">
    <system>
        . . . system elements . . .
    </system>
    <data> . . . </data>
    <data> . . . </data>
    <system_update> . . . </system_update>
    <data> . . . </data>
    <system_update> . . . </system_update>
    <data> . . . </data>
    <data> . . . </data>
    . . .
</transducerML>
```

The element transducerML is the default root element. Specific protocol implementations of TML may need to replace the root element.

The default root element designates the version of the schema (document type). When implement in protocols, the namespace designation for the elements will indicate the version.

```
<p:protocolRoot xmlns:p="myprotocol.xom/ns/foo"
    xmlns:tml="http://transducerml.org/ns/0.9beta">
```

System

```
<!ELEMENT system (models, sensors, dependencies)>
<!ATTLIST system
    id ID #REQUIRED>
```

System contains a sequence of models, sensors and dependencies, in that order. A system has a unique identifier.

```
<system id="Sys001">
    <models> . . . </models>
    <sensors> . . . </sensors>
    <dependencies> . . . </dependencies>
</system>
```

Models

```
<!ELEMENT models (model*)>
<!ELEMENT model (description?,datapoints)>
<!ELEMENT datapoints (#PCDATA)>
```

The models element contains zero or more model elements. The model element contains a datapoints element and may contain a description element. The description element is generic throughout the schema.

```
<models>
    <model id="M0001">
        <description>
            <property name="nomenclature">frequency response model
            </property>
        </description>
        <datapoints count="15">0 0.1 0.2 0.5 0.7 0.9 1.0 1.0 1.0
0.9 0.7 0.5 0.2 0.1 0</datapoints>
    </model>
    <model id="M0002">
        <datapoints count="9">.45 .67 .81 .92 1.00 .92 .81 .67
.45</datapoints>
    </model>
    <model id="M0003">
        <datapoints count="15">.01 .015 .13 .21 .30 .42 .50 .58 .69
.78 .82 .88 .91 .98 1.00</datapoints>
    </model>
    <model id="ST001">
        <datapoints count="1000000"/>
    </model>
</models>
```

A model has an identifier unique within the system definition.

A model defines a curve. The data points are evenly distributed across the x-axis. The values are the positions relative to the y-axis. The sample model M0001 defines the curve shown in FIG. 27.

An empty set of data points such as model ST001 means that all of the values are zero.

Sensors

```
<!ELEMENT sensors (sensor*)>
<!ELEMENT sensor (description,frame)>
<!ATTLIST sensor
    id ID #REQUIRED
    urn CDATA #IMPLIED>
```

Sensor URN

A sensor has a identifier unique within the system definition. Preferably, sensosrs would use a uniform resource name (URN) as their identifier. In a protocol implementation, a stream could begin with a simple empty sensor element as follows:

```
<system id="sensor1" urn="urn:x-dod:transducer:af:123456789-102"/>
```

The subscriber could check if it has this sensor definition already locally stored. If not then the subscriber could look up the sensor in some well-known repository. If that should fail, then the subscriber could ask the publisher to send the complete sensor definition.

Within the stream, elements would reference the stream by its shorter ID attribute rather than its longer URN attribute.

Frames

```
<!ELEMENT frame (ST_model,sample)>
<!ATTLIST frame
    count CDATA #REQUIRED>
```

A sensor contains a description and a single frame. A frame contains an space-time model and a single sample definition.

The data elements within the TransducerML stream represent a cluster. A cluster may contain one frame, multiple frames, or a fraction of a frame. The number of frames within a cluster remains consistent for a particular sensor. The count attribute indicates the number of frames per cluster.

Some sensors such as sound have very small frames. It is useful to bundle several small frames into a single data element (cluster) to reduce overhead.

Dividing a frame that is especially large (more than 500 kilobytes?) may make it easier to parse and check for errors. If a cluster is a fraction of a frame, then the count attribute will be less than 1, as in "0.25". A sequence of clusters, that is data elements, that are the same frame would all have the same time stamp.

Space-Time Model

```
<!ELEMENT ST_model (time?,axis*,sequence?)>
<!ATTLIST ST_model
    scf_dimension CDATA #REQUIRED
    os_coord_sys (polar | cartesian) #REQUIRED>
<!ELEMENT time (model,property*)>
<!ELEMENT sequence (model,property*)>
<!ELEMENT axis (model,property*)>
<!ATTLIST axis
    map CDATA #REQUIRED>
```

A space-time model has a time model, zero or more axis models and a sequence model. The scf_dimension attribute indicates how many axis models there should be.

```
<ST_model scf_dimension="2" os_coord_sys="polar">
    <time>
        <model ref="ST001"/>
        <property name="time_interval">1E-3</property>
        <property name="temporal_accuracy">1E-6</property>
    </time>
    <axis map="x">
        <model ref="ST001"/>
        <property name="axis_assoc">alpha</property>
        <property name="range">1.2</property>
        <property name="tics">10000</property>
        <property name="samples">1000</property>
    </axis>
    <axis map="y">
        <model ref="ST001"/>
        <property name="axis_assoc">beta</property>
        <property name="range">1.2</property>
        <property name="tics">10000</property>
        <property name="samples">1000</property>
    </axis>
</ST_model>
```

With each of these examples, the models are straight zeroes, meaning that the samples are all instantaneous. A more complex example is provided later in this document.

Sample

```
<!ELEMENT sample (measurement+)>
<!ATTLIST sample
    count CDATA #REQUIRED>
```

A frame consists of samples. The space-time model defines the relationship of the samples to space and time. A frame will have a set number of samples. For example, if the sensor provides an image that is 1000×1000 pixels, then the sample size is 1 million.

Each sample consists of one or more measurements. If the sensor provides a monochromatic image, then each sample is one measurement of a gray scale. If the image is color, then each sample is three measurements for red, green and blue. Multi-spectral analysis can actually create thousands of measurements for each sample.

Measurements

```
<!ELEMENT measurement (description, encoding,
    (property|characteristic)*)>
<!ATTLIST measurement
    id ID #REQUIRED>
```

A measurement contains a description and an encoding followed by zero or more properties or characteristics in any order.

```
<sample count="1000000">
    <measurement id="S001E001">
        <description>
            <property name="nomenclature">spatial module monochrome incident light</property>
        </description>
        <encoding>
            <bits>8</bits>
            <datatype>positive_int</datatype>
```

-continued

```
        <units>lumens</units>
        <range>0 255</range>
    </encoding>
    <property name="abs_accuracy">0.25</characteristic>
    <property name="rel_accuracy">0.01</characteristic>
    <property name="measure_duration">15</characteristic>
    <characteristic type="freq_resp">
        <model ref="M0001"/>
        <property name="range">400E-9</property>
        <property name="center">500E-9</property>
    </characteristic>
    <characteristic type="3dbifov_alpha">
        <model ref="M0002"/>
        <property name="scale">500</property>
        <property name="azimuth_range">.0012</property>
    </characteristic>
    <characteristic type="3dbifov_beta">
        <model ref="M0002"/>
        <property name="scale">500</property>
        <property name="azimuth_range">.0012</property>
    </characteristic>
    <characteristic type="stim_resp_fcn">
        <model ref="M0003"/>
        <property name="gain" dependency_ID="S001E001D1"/>
        <property name="bais">0</property>
    </characteristic>
    </measurement>
</sample>
```

Encoding

```
<!ELEMENT encoding (bits, datatype, units, range)>
<!ELEMENT bits (#PCDATA)>
<!ELEMENT datatype (#PCDATA)>
<!ELEMENT units (#PCDATA)>
<!ELEMENT range (#PCDATA)>
```

An encoding defines bits, data type, units and range. These particular characteristics of a measurement must be present for all measurements, so they are not treated generically using a characteristic element. The encoding children are used to parse the data elements.

```
<sensor>
    <frame count="1">
        <sample count="10000">
            <measurement>
                <encoding>
                    <bits>6</bits>
                </encoding>
            </measurement>
            <measurement>
                <encoding>
                    <bits>8</bits>
                </encoding>
            </measurement>
            <measurement>
                <encoding>
                    <bits>6</bits>
                </encoding>
            </measurement>
        </sample>
    </frame>
</sensor>
```

The previous fragment defines a sample of three measurements. For simplicity of explaination, the example above does not include some mandatory elements which are not relevant to the discussion. The first measurement is 6 bits, the second is 8 bits, and the third is 6 bits. The total sample is 20 bits, which can be expressed with 5 hexadecimal characters shown in FIG. 28.

Using the sample encoding, the hex string "558B1" would represent a first measurement value of 13, a second measurement value of 57 and a third measurement value of 9.

Padding

Measurements are given in bits. The character data within the data elements is in hexadecimal encoding (0-9A-F) to avoid any special characters that would choke the XML parser. If the measurements do not map evenly over four bits, then the character data is padded with zeroes at the very end of the cluster.

Characteristics

```
<!ELEMENT characteristic (model?,property*)>
<!ATTLIST characteristic
        type CDATA #REQUIRED>
```

Characteristics provide more fidelity than properties. A characteristic element can contain a model element and zero or more property elements. Characteristics enable us to communicate complex properties such as frequency response. For instance, the following characteristic tells us that the frequency response is a typical bell curve extends from 300 µHz to 700 µHz.

```
<model id="M0001">
    <datapoints count="15">0 0.1 0.2 0.5 0.7 0.9 1.0 1.0 1.0 0.9 0.7 0.5 0.2 0.1 0</datapoints>
</model>
...
<characteristic type="freq_resp">
    <model ref="M0001"/>
    <property name="range">400E-9</property>
    <property name="center">500E-9</property>
</characteristic>
```

Figure 28:
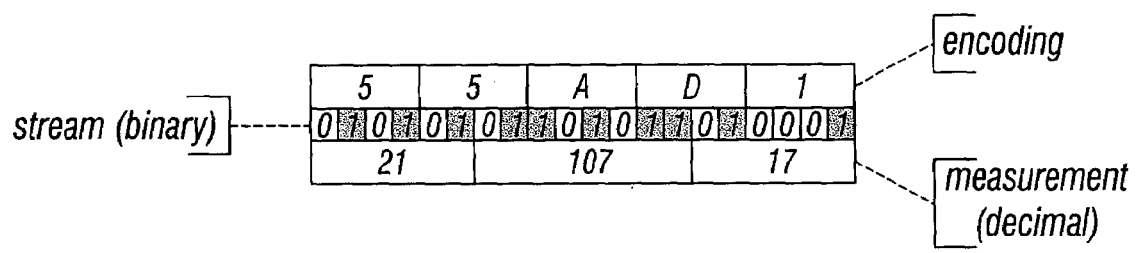
FIG. 28 is an example of an encoding fragement.

The frequency response characteristic is shown in FIG. 28.

Properties

```
<!ELEMENT description (property*)>
<!ELEMENT property (#PCDATA)>
<!ATTLIST property
        name CDATA #REQUIRED
        dependency_ID ID #IMPLIED>
```

Descriptions and properties are generic to this schema. Descriptions are a collection of properties. Properties are simple name-value pairs. We take this generic approach for two reasons. First, it is impossible to anticipate all the properties necessary to communicate transducer information. Second, we are able to treat all properties generically for display purposes or use within tools.

Measurement Value Dependencies

The attribute dependency_ID is set for reference later in the dependencies section. For instance, this characteristic flags the gain property of the stim_resp_fcn (stimulus response function) characteristic as dependent upon some other sensor's measurement value. A dependency will reference this dependency identifier in the dependencies section of the system definition.

```
<characteristic type="stim_resp_fcn">
    <model ref="M0003"/>
    <property name="gain" dependency_ID="S001E001D1"/>
    <property name="bais">0</property>
</characteristic>
```

Dependencies are defined outside of the sensor definition in order to enable plug-and-play of sensors into different systems.

Dependencies

```
<!ELEMENT dependencies (dependency*)>
<!ELEMENT dependency ((attached|(position?,attitude?)),
dependent_value*)>
<!ATTLIST dependency
    sensor_ref IDREF #REQUIRED>
<!ELEMENT attached (EMPTY)>
<!ATTLIST attached
    sensor_ref IDREF #REQUIRED>
<!ELEMENT position (x,y,z)>
<!ATTLIST position
    sensor_ref IDREF #REQUIRED>
<!ELEMENT x (measurement_value|(value,abs_accy))>
<!ELEMENT y (measurement_value|(value,abs_accy))>
```

-continued

```
<!ELEMENT z (measurement_value|(value,abs_accy))>
<!ELEMENT attitude (omega,phi,gamma)>
<!ATTLIST attitude
    sensor_ref IDREF #REQUIRED>
<!ELEMENT omega (measurement_value|(value,abs_accy))>
<!ELEMENT phi (measurement_value|(value,abs_accy))>
<!ELEMENT gamma (measurement_value|(value,abs_accy))>
<!ELEMENT dependent_value (measurement_value)>
<!ATTLIST dependent_value
    ref IDREF #REQUIRED>
```

The dependencies section enables us to plug-and-play sensors together into a system definition. We are primarily concerned with plugging together the position and attitude of sensors. The position and attitude are the key properties necessary for most sensor fusion efforts. However, any property of a sensor can be dependent upon another sensor measurement.

The dependencies element contains zero or more dependency elements. Each dependency element references a particular sensor by its unique identifier. All the dependencies for a particular sensor should be defined within a single dependency element.

A dependency element contains either an attached element or a position and attitude element followed by zero or more dependent_value elements.

```
<dependencies>
    <dependency sensor_ref="S001">
        <position sensor_ref="S002">
            <x><value>12.005</value><abs_accy>.001</abs_accy></x>
            <y><value>-4.452</value><abs_accy>.001</abs_accy></y>
            <z><value>0.2136</value><abs_accy>.001</abs_accy></z>
        </position>
        <attitude sensor_ref="S002">
            <omega><value>.86</value><abs_accy>.01
            </abs_accy></omega>
            <phi><value>-.86</value><abs_accy>.01</abs_accy></phi>
            <gamma><value>.13</value><abs_accy>.01
            </abs_accy></gamma>
        </attitude>
        <dependent_value ref="S001E001D1"><measurement_value
ref="S005E001"/></dependency_value>
    </dependency>
    <dependency sensor_ref="S002">
        <position sensor_ref="S003">
            <x><value>1.030</value><abs_accy>.001</abs_accy></x>
            <y><value>-4.452</value><abs_accy>.001</abs_accy></y>
            <z><value>0.213</value><abs_accy>.001</abs_accy></z>
        </position>
        <attitude sensor_ref="S004">
            <omega><measurement_value ref="S002E001"/></omega>
            <phi><value>-0.34</value><abs_accy>.01</abs_accy></phi>
            <gamma><value>.13</value><abs_accy>.01
            </abs_accy></gamma>
        </attitude>
    </dependency>
    <dependency sensor_ref="S003">
        <position sensor_ref="ECEF">
            <x><measurement_value ref="S003001"/></x>
            <y><measurement_value ref="S003001"/></y>
            <z><measurement_value ref="S003001"/></z>
        </position>
    </dependency>
    <dependency sensor_ref="S004">
        <attitude sensor_ref="ECEF">
            <omega><measurement_value ref="S004E001"/></omega>
            <phi><measurement_value ref="S004E001"/></phi>
            <gamma><measurement_value ref="S004E001"/></gamma>
        </attitude>
    </dependency>
```

-continued

```
<dependency sensor_ref="S005">
    <attached sensor_ref="S001"/>
</dependency>
</dependencies>
```

Attached, Position and Attitude

An Attached element is empty and simply references another sensor. The presence of an Attached element means that the sensor referenced by the dependency element should be treated as if it had the exact same location and attitude as the sensor referenced by the Attached element.

```
<dependency sensor_ref="S005">
    <attached sensor_ref="S001"/>
</dependency>
```

The Position element defines the x, y and z dimensional position of a sensor relative to another sensor. The difference is simple arithmetic. The value added can be either a number or a measurement value reading. If it is a number, then it must be accompanied by an accuracy value. The following fragment states that the position of sensor S001 is dependent upon the location of sensor S002.

```
<dependency sensor_ref="S001">
    <position sensor_ref="S002">
        <x><value>12.005</value><abs_accy>.001</abs_accy></x>
        <y><value>-4.452</value><abs_accy>.001</abs_accy></y>
        <z><value>0.2136</value><abs_accy>.001</abs_accy></z>
    </position>
```

The Attitude element defines the omega, phi and gamma ($\omega,\phi,\gamma$) angle positions of a sensor relative to another sensor. The Position and attitude of a particular sensor can be dependent upon different sensors.

Measurement References

Changes in position and attitude are calculated from sensor Measurements. The measurement_value element defines the dependency. The measurement_value element references the unique identifier of a sensor sample measurement defined in the sensors section.

```
<dependency sensor_ref="S004">
    <attitude sensor_ref="ECEF">
        <omega><measurement_value ref="S004E001"/></omega>
        <phi><measurement_value ref="S004E001"/></phi>
        <gamma><measurement_value ref="S004E001"/></gamma>
    </attitude>
```

Any sensor property can be dependent upon another sensor measurement. The following completes the dependency of the gain property for a sensor upon the measurement of another sensor.

```
<sensors> . . .
    <property name="gain" dependency_ID="S001E001D1"/>
    . . .
<dependencies> . . .
    <dependent_value ref="S001E001D1"><measurement_value ref="S005E001"/></dependency_value>
```

Data

```
<!ELEMENT data (#PCDATA)>
<!ELEMENT data
    ref IDREF #REQUIRED
    stamp CDATA #REQUIRED>
```

See section [000175] Encoding.

System Updates

```
<!ELEMENT system_update
    (model*,sensor_update*,dependency_update*)>
<!ATTLIST system_update
    stamp CDATA #REQUIRED>
<!ELEMENT sensor_update (description?,frame?)>
<!ATTLIST sensor_update
    sensor_ref IDREF #REQUIRED>
<!ELEMENT dependency_update ((attached|(position?,attitude?)),
dependent_value*)>
<!ATTLIST dependency_update
    sensor_ref IDREF #REQUIRED>
```

A system of sensors may change after the stream of data has begun. These changes come as system_update elements. The system_update can contain new models, sensor updates or dependency updates. For sensor updates and dependency updates, only the information that has changed is sent. Updates are sent within the proper nested elements.

Figure 27:
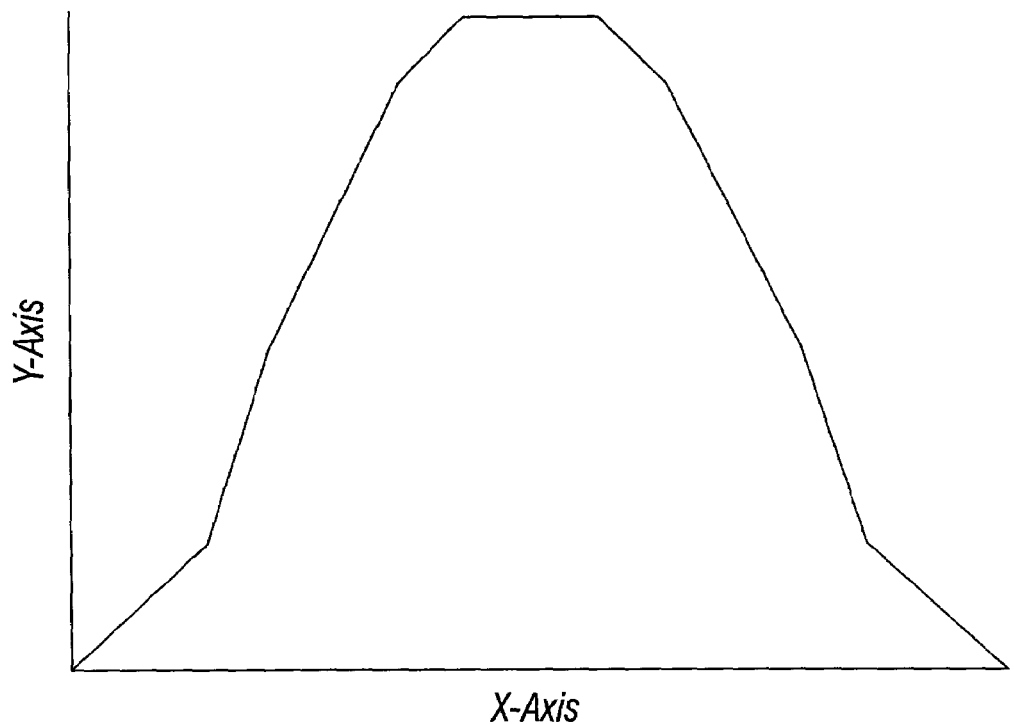
FIG. 27 is a graphical representation of a model curve, which exemplifies a frequency response curve.

In the following example, only the frequency response (freq_resp) characteristic of measurement MS001E001 has changed. However, measurement characteristics are nested within sensor, frame and sample elements. A graphical representation of the frequency response is shown in FIG. 27, (which has been earlier exemplified as a model curve.)

```
<system_update timestamp= "">
    <model id="MX009">
        <datapoints> . . . </datapoints>
    </model>
    <sensor_update ref="S001">
        <frame>
            <sample>
                <measurement ref="MS001E001">
                    <characteristic type="freq_resp">
                        <model ref="MX009"/>
                        <property name="range">400E-9</property>
                        <property name="center">500E-9</property>
                    </characteristic>
                </measurement>
            </sample>
        </frame>
    </sensor_update>
</system_update>
```

Space-Time Model Example

```
...
<models>
    <model id="MA-X">
        <datapoints count="16">-50 -32 32 50 45 30 -30 -45 -45
-30 30 45 50 32 -32 -50</datapoints>
    </model>
    <model id="MA-Y">
        <datapoints count="16">50 45 45 50 32 30 30 32 -32 -30
-30 -32 -50 -45 -45 -50</datapoints>
    </model>
    <model id="MA-S">
        <datapoints count="16">0 1 2 3 7 6 5 4 8 9 10 11 15 14 13
12</datapoints>
    </model>
    <model id="MA-T">
        <datapoints count="16">0 2 4 6 8 10 12 14 16 18 20 22 24 26
28 30</datapoints>
    </model>
</models>
...
<ST_model scf_dimension="2" os_coord_sys="polar">
    <time>
        <model ref="MA-T"/>
        <property name="time_interval">1E-3</property>
        <property name="temporal_accuracy">1E-6</property>
    </time>
    <axis map="x">
        <model ref="MA-X"/>
        <property value="axis_assoc">alpha</property>
        <property value="range">1.2</property>
        <property value="tics">101</property>
        <property value="samples">4</property>
    </axis>
    <axis map="y">
        <model ref="MA-Y"/>
        <property value="axis_assoc">alpha</property>
        <property value="range">1.2</property>
        <property value="tics">101</property>
        <property value="samples">4</property>
    </axis>
    <sequence>
        <model ref="MA-S"/>
    </sequence>
</ST_model>
...
```

Sequence Model

```
<model id="MA-S">
    <datapoints count="16">0 1 2 3 7 6 5 4 8 9 10 11 15 14 13
12</datapoints>
</model>
```

The sequence model is read left-to-right, top-to-bottom, front-to-back across the dimensions of the space model. In this case, the x-dimension and y-dimension are both 4, as indicated in their sample property.

| 0 | 1 | 2 | 3 |
|---|---|---|---|
| 7 | 6 | 5 | 4 |
| 8 | 9 | 10 | 11 |
| 15 | 14 | 13 | 12 |

The other data points map to the physical dimensions in the sequence specified in the sequence model.

```
<model id="MA-X">
    <datapoints count="16">-50 -32 32 50 45 30 -30 -45 -45 -30
30 45 50 32 -32 -50</datapoints>
</model>
```

| -50 | -32 | 32 | 50 |
|---|---|---|---|
| -45 | -30 | 30 | 45 |
| -45 | -30 | 30 | 45 |
| -50 | -32 | 32 | 50 |

Document Type Definition

```
<!-- TransducerML DTD version 0.9beta
Copyright © 2003. Iris Corporation.
-->
<!ELEMENT transducerML (system,(system_update*|data*))>
<!ATTLIST transducerML
    version CDATA #FIXED "0.9beta">
<!ELEMENT system (models,sensors,dependencies)>
<!ATTLIST system
    id ID #REQUIRED>
<!ELEMENT models (model*)>
<!ELEMENT model (description?,datapoints)>
<!ELEMENT datapoints (#PCDATA)>
<!ELEMENT description (property*)>
<!ELEMENT property (#PCDATA)>
<!ATTLIST property
    name CDATA #REQUIRED
    dependency_ID ID #IMPLIED>
<!ELEMENT measurement_value EMPTY>
<!ATTLIST measurement_value
    ref IDREF #REQUIRED>
<!ELEMENT sensors (sensor*)>
<!ELEMENT sensor (description,frame)>
<!ATTLIST sensor
    id ID #REQUIRED
    urn CDATA #IMPLIED>
<!ELEMENT frame (ST_model,sample)>
<!ELEMENT ST_model (time?,axis*,sequence?)>
<!ATTLIST ST_model
    scf_dimension CDATA #REQUIRED
    os_coord_sys (polar | cartesian) #REQUIRED>
<!ELEMENT time (model,property*)>
<!ELEMENT sequence (model,property*)>
<!ELEMENT axis (model,property*)>
<!ATTLIST axis
    map CDATA #REQUIRED>
<!ELEMENT sample (measurement+)>
<!ATTLIST sample
    count CDATA #REQUIRED>
<!ELEMENT measurement (description, encoding,
(property|characteristic)*)>
<!ATTLIST measurement
    id ID #REQUIRED>
<!ELEMENT encoding (bits, datatype, units, range)>
<!ELEMENT bits (#PCDATA)>
<!ELEMENT datatype (#PCDATA)>
<!ELEMENT units (#PCDATA)>
<!ELEMENT range (#PCDATA)>
<!ELEMENT characteristic (model?,property*)>
<!ATTLIST characteristic
    type CDATA #REQUIRED>
<!ELEMENT dependencies (dependency*)>
<!ELEMENT dependency ((attached|(position?,attitude?)),
dependent_value*)>
<!ATTLIST dependency
    sensor_ref IDREF #REQUIRED>
<!ELEMENT attached (EMPTY)>
<!ATTLIST attached
    sensor_ref IDREF #REQUIRED>
<!ELEMENT position (x,y,z)>
<!ATTLIST position
    sensor_ref IDREF #REQUIRED>
<!ELEMENT x (measurement_value|(value,abs_accy))>
<!ELEMENT y (measurement_value|(value,abs_accy))>
```

```
<!ELEMENT z (measurement_value|(value,abs_accy))>
<!ELEMENT attitude (omega,phi,gamma)>
<!ATTLIST attitude
    sensor_ref IDREF #REQUIRED>
<!ELEMENT omega (measurement_value|(value,abs_accy))>
<!ELEMENT phi (measurement_value|(value,abs_accy))>
<!ELEMENT gamma (measurement_value|(value,abs_accy))>
<!ELEMENT dependent_value (measurement_value)>
<!ATTLIST dependent_value
    ref IDREF #REQUIRED>
<!ELEMENT datastream ((system_update|data)*)>
<!ATTLIST datastream
    system_ref IDREF #REQUIRED>
<!ELEMENT system_update (model*,sensor_update*,
dependency_update*)>
<!ATTLIST system_update
    stamp CDATA #REQUIRED>
<!ELEMENT sensor_update (description?,frame?)>
<!ATTLIST sensor_update
    sensor_ref IDREF #REQUIRED>
<!ELEMENT dependency_update ((attached|(position?,attitude?)),
dependent_value*)>
<!ATTLIST dependency_update
    sensor_ref IDREF #REQUIRED>
<!ELEMENT data (#PCDATA)>
<!ELEMENT data
    ref IDREF #REQUIRED
    stamp CDATA #REQUIRED>
```

A Comprehensive Example Follows

```
<?xml version="1.0"?>
<transducerML version="0.9beta">
    <system id="Sys001">
        <models>
            <model id="M0001">
            <description>
                <property name="nomenclature">frequency response model</property>
            </description>
            <datapoints count="15">0 0.1 0.2 0.5 0.7 0.9 1.0 1.0 1.0 0.9 0.7 0.5 0.2
0.1 0</datapoints>
            </model>
            <model id="M0002">
                <datapoints count="9">.45 .67 .81 .92 1.00 .92 .81 .67 .45</datapoints>
            </model>
            <model id="M0003">
                <datapoints count="15">.01 .015 .13 .21 .30 .42 .50 .58 .69 .78 .82 .88 .91
.98 1.00</datapoints>
            </model>
            <model id="ST001">
                <datapoints count="1000000"/>
            </model>
        </models>
        <sensors>
            <sensor id="S001" urn="urn:x-dod:transducer:DB110-123456789">
                <description>
                    <property name="nomenclature">Framing CCD LOROP Camera</property>
                    <property name="model_number">DB110</property>
                    <property name="serial_no">123456789</property>
                    <property name="category">primary</property>
                    <property name="sensor_type">remote</property>
                    <property name="stimulus_source">ambient</property>
                    <property name="sample_rate">351</property>
                </description>
                <frame count="1">
                    <ST_model scf_dimension="2" os_coord_sys="polar">
                        <time>
                            <model ref="ST001"/>
                            <property name="time_interval">1E-3</property>
                            <property name="temporal_accuracy">1E-6</property>
                        </time>
                        <axis map="x">
                            <model ref="ST001"/>
                            <property name="axis_assoc">alpha</property>
                            <property name="range">1.2</property>
                            <property name="tics">10000</property>
                            <property name="samples">1000</property>
                        </axis>
                        <axis map="y">
                            <model ref="ST001"/>
                            <property name="axis_assoc">beta</property>
                            <property name="range">1.2</property>
                            <property name="tics">10000</property>
                            <property name="samples">1000</property>
                        </axis>
                    </ST_model>
```

-continued

```
                <sample count="1000000">
                    <measurement id="S001E001">
                        <description>
                            <property name="nomenclature">spatial module monochrome incident
light</property>
                        </description>
                        <encoding>
                            <bits>8</bits>
                            <datatype>positive_int</datatype>
                            <units>lumens</units>
                            <range>0 255</range>
                        </encoding>
                        <characteristic type="abs_accuracy">0.25</characteristic>
                        <characteristic type="rel_accuracy">0.01</characteristic>
                        <characteristic type="measure_duration">15</characteristic>
                        <characteristic type="freq_resp">
                            <model ref="M0001"/>
                            <property name="range">400E-9</property>
                            <property name="center">500E-9</property>
                        </characteristic>
                        <characteristic type="3dbifov_alpha">
                            <model ref="M0002"/>
                            <property name="scale">500</property>
                            <property name="azimuth_range">.0012</property>
                        </characteristic>
                        <characteristic type="3dbifov_beta">
                            <model ref="M0002"/>
                            <property name="scale">500</property>
                            <property name="azimuth_range">.0012</property>
                        </characteristic>
                        <characteristic type="stim_resp_fcn">
                            <model ref="M0003"/>
                            <property name="gain" dependency_ID="S001E001D1"/>
                            <property name="bais">0</property>
                        </characteristic>
                    </measurement>
                </sample>
            </frame>
        </sensor>
        <sensor id="S002">
        </sensor>
    </sensors>
    <dependencies>
        <dependency sensor_ref="S001">
            <position sensor_ref="S002">
                <x><value>12.005</value><abs_accy>.001</abs_accy></x>
                <y><value>-4.452</value><abs_accy>.001</abs_accy></y>
                <z><value>0.2136</value><abs_accy>.001</abs_accy></z>
            </position>
            <attitude sensor_ref="S002">
                <omega><value>.86</value><abs_accy>.01</abs_accy></omega>
                <phi><value>-.86</value><abs_accy>.01</abs_accy></phi>
                <gamma><value>.13</value><abs_accy>.01</abs_accy></gamma>
            </attitude>
            <dependent_value ref="S001E001D1"><measurement_value
ref="S005E001"/></dependency_value>
        </dependency>
        <dependency sensor_ref="S002">
            <position sensor_ref="S003">
                <x><value>1.030</value><abs_accy>.001</abs_accy></x>
                <y><value>-4.452</value><abs_accy>.001</abs_accy></y>
                <z><value>0.213</value><abs_accy>.001</abs_accy></z>
            </position>
            <attitude sensor_ref="S004">
                <omega><measurement_value ref="S002E001"/></omega>
                <phi><value>-0.34</value><abs_accy>.01</abs_accy></phi>
                <gamma><value>.13</value><abs_accy>.01</abs_accy></gamma>
            </attitude>
        </dependency>
        <dependency sensor_ref="S003">
            <position sensor_ref="ECEF">
                <x><measurement_value ref="S003001"/></x>
                <y><measurement_value ref="S003001"/></y>
                <z><measurement_value ref="S003001"/></z>
            </position>
        </dependency>
```

-continued

```
<dependency sensor_ref="S004">
    <attitude sensor_ref="ECEF">
        <omega><measurement_value ref="S004E001"/></omega>
        <phi><measurement_value ref="S004E001"/></phi>
        <gamma><measurement_value ref="S004E001"/></gamma>
    </attitude>
</dependency>
<dependency sensor_ref="S005">
    <attached sensor_ref="S001"/>
</dependency>
    </dependencies>
</system>
...
<data/>
...
</transducerML>
```

[ ]The attached CD ROM DISC contains a comprehensive example of Transducer and is part of the disclosure therein.

The invention claimed is:

1. A method for capturing and processing data generated from first and second dissimilar transducers each of which normally transmit data in respectively unique formats, said method comprising the steps of:

creating a model of said first transducer;
creating a model of said second transducer;
creating a hierarchal data format;
causing said first transducer to transmit data only in said created hierarchal data format and only after first sending said created model of said first transducer;
causing said second transducer to transmit data only in said created hierarchal data format and only after first sending said created model of said second transducer;
receiving said transmitted model and data from said first transducer and said transmitted model and data from said second transducer and using said received models to process said received data; and
providing an output which is based upon said processed received data.

2. The method of claim 1 wherein said models are each transmitted in a common format.

3. The method of claim 2 wherein each of said models are expressed with said standardized hierarchal format.

* * * * *